(12) United States Patent
Inoue

(10) Patent No.: US 7,000,240 B2
(45) Date of Patent: Feb. 14, 2006

(54) CARTRIDGE FOR EXCHANGEABLY CONTAINING A DISC

(75) Inventor: Naoki Inoue, Kanagawa (JP)

(73) Assignee: Sony Corporation, Tokyo (JP)

( * ) Notice: Subject to any disclaimer, the term of this patent is extended or adjusted under 35 U.S.C. 154(b) by 170 days.

(21) Appl. No.: 10/433,071

(22) PCT Filed: Sep. 25, 2002

(86) PCT No.: PCT/JP02/09821

§ 371 (c)(1),
(2), (4) Date: May 29, 2003

(87) PCT Pub. No.: WO03/032316

PCT Pub. Date: Apr. 17, 2003

(65) Prior Publication Data

US 2004/0148624 A1 Jul. 29, 2004

(30) Foreign Application Priority Data

Oct. 1, 2001 (JP) .................................... 2001-305812

(51) Int. Cl.
*G11B 23/03* (2006.01)

(52) U.S. Cl. ............................................... 720/741
(58) Field of Classification Search ................ 720/741, 720/738, 725

See application file for complete search history.

(56) References Cited

U.S. PATENT DOCUMENTS

| | | | | |
|---|---|---|---|---|
| 6,205,116 B1 | * | 3/2001 | Hashimoto | 720/741 |
| 6,728,199 B1 | * | 4/2004 | Obata et al. | 720/738 |
| 2002/0012316 A1 | * | 1/2002 | Inoue et al. | 369/291 |

FOREIGN PATENT DOCUMENTS

| | | | |
|---|---|---|---|
| JP | 2000-30396 | | 1/2000 |
| JP | 2000-90628 | | 3/2000 |
| JP | 2000-113630 | | 4/2000 |
| JP | 2001093252 A | * | 4/2001 |

* cited by examiner

Primary Examiner—Tianjie Chen
(74) Attorney, Agent, or Firm—Frommer Lawrence & Haug LLP; William S. Frommer

(57) ABSTRACT

A cartridge for encasing a disc replaceably, including a cartridge body (2) having a write/read opening (24) formed in the bottom thereof, an inner rotor (4) rotatably received in the cartridge body (2) and having formed therein an opening (44) corresponding to the opening (24), and a pair of shutter members which uncovers the openings (24, 44) when the inner rotor (4) rotates until the openings (24, 44) are aligned with each other.

8 Claims, 22 Drawing Sheets

CARTRIDGE FOR EXCHANGEABLY CONTAINING A DISC

TECHNICAL FIELD

The present invention relates to a cartridge for replaceably encasing a desired one of discs as information signal recording media of different diameters and permitting to load the recording medium encased therein into a recorder and/or player dedicated for disc cartridges.

BACKGROUND ART

If an optical disc as an information signal recording medium has foreign matter such as dust, fingerprint or the like adherent to the signal recording surface thereof, for example, information signal may not possibly be recorded or reproduced accurately. On this account, the optical disc of this type is usually encased in a cartridge body for use as a disc cartridge. For example, the optical disc is rotatably encased in a cartridge body having a write/read opening. The cartridge body has provided therein shutter members to cover and uncover the write/read opening. The disc cartridge provided with the shutter members has the opening covered with the shutter members when it is not used in a recorder and/or player, to protect the optical disc held in the cartridge body. When the disc cartridge is loaded in the recorder and/or player, the shutter members are moved by a shutter releasing mechanism provided in the recorder and/or player to uncover the write/read opening.

In the meantime, the optical discs include a one adopting a recording format in common to an optical disc pre-encased in a disc cartridge and which can be loaded, being bare, namely, not being encased in any cartridge, in a dedicated recorder and/or player to under go write or read of information signal.

However, in case one of the optical discs is loaded, encased in a disc cartridge, into a recorder and/or player while the other is loaded, not encased in any cartridge, into a recorder and/player, information signal cannot be written to, or read from, these two optical discs by any common recorder and/or player even if the optical discs adopt a recording format in common.

DISCLOSURE OF THE INVENTION

Accordingly, the present invention has an object to overcome the above-mentioned drawbacks of the related art by providing a cartridge for encasing a disc removably, and which permits to load itself having encased therein a recording medium normally used bare, namely, not encased in any cartridge or the like, into a recorder and/or player dedicated for a disc cartridge having a recording medium pre-encased therein.

The present invention has another object to provide a cartridge which can be assembled in generally same assembling steps as those for a disc cartridge, can easily be assembled, and which can encase a disc removably.

The present invention has still another object to provide a cartridge capable of preventing a disc held in a disc receptacle from coming off, and which can encase a disc removably and protect the disc.

The present invention has yet another object to provide a cartridge which can prevent a disc once encased therein from being stained and/or damaged at the signal recording surface of the disc by restricting easy insertion or removal of the disc.

The above object can be attained by providing a cartridge including according to the present invention:

a cartridge body consisting of an upper shell having a disc insertion/removal opening formed in the main side thereof and a lower shell, butted to each other to define a disc receptacle in which a disc is rotatably held, the lower shell having formed therein a first opening through which a disc held in the disc receptacle is at least partially exposed to output;

a middle shell disposed rotatably in the cartridge body to define the bottom of the disc receptacle by the main side thereof, having the main side thereof exposed to outside through the insertion/removal opening in the upper shell, having formed in the main side thereof a second opening corresponding to the first opening in the lower shell of the cartridge body and which is rotatably received in the cartridge body; and a pair of shutter members which uncovers the first and second openings when the middle shell rotates until the first and second openings are aligned with each other.

The above cartridge according to the present invention has a user's desired disc received in the disc receptacle through the insertion/removal opening, and is loaded into a recorder and/or player. Since this cartridge is formed to have a similar construction including the shutter members, except for the insertion/removal opening formed in the upper shell, to a disc cartridge of which the disc once encased therein cannot be replaced with another, so it can be loaded into a recorder and/or player dedicated for the recording-medium cartridge.

The above cartridge according to the present invention may have come-off preventive mechanisms provided around the insertion/removal opening to prevent a disc received in the disc receptacle through the insertion/removal opening from coming off. For example, each come-off preventive mechanism is composed of a disc insertion guide to guide a disc being inserted into the disc receptacle and a come-off preventive piece to prevent the disc once received in the fisc receptacle from coming off. The come-off preventive piece is formed integrally on contact with elastically flexible pieces which are elastically moved radially of the disc receptacle. The come-off preventive mechanism may be provided in a plurality of places around the insertion/removal opening to positively hold the disc in the disc receptacle.

The come-off preventive mechanisms provided in above cartridge according to the present invention may be as will be described below. That is, each of the come-off preventive mechanisms includes a come-off preventive member received in a receiver formed in the wall of the insertion/removal opening in the upper shell to prevent a disc received in the disc receptacle from coming off. The come-off preventive member includes elastically flexible pieces each having an engagement portion formed at one end thereof, and an operating piece to move the come-off preventive piece between a come-off preventive position where the come-off preventive mechanism is to prevent the disc received in the disc receptacle and an access position in which the disc is to be inserted and/or removed. Correspondingly, the receiver includes a first engagement concavity in which the engagement portion is engaged when the come-off preventive mechanism holds the come-off preventive member in the come-off preventive position, and a second engagement concavity in which the engagement portion is engaged when the come-off preventive mechanism holds the come-off preventive member in the access position. The come-off preventive mechanism may be provided in a plurality of places in order to prevent the disc from being caused by a wrong operation to come off the disc receptacle.

Further, the above cartridge according to the present invention may be provided with a cover as a come-off preventive mechanism to uncover and cover the insertion/removal opening. Also, the cartridge may be provided with a locking mechanism to lock the cover in a closed position. The locking mechanism has a cover operating member disposed in the receiver formed in the wall of the insertion/removal opening in the upper shell. The cover operating member includes a first elastically flexible piece having provided at an end thereof a locking portion which is engaged on the engagement piece on the cover, a second elastically flexible piece having an engagement portion provided at an end thereof, and an operating portion which moves the cover operating member between a locking position in which the locking portion is engaged on the engagement piece and an unlocking position in which the locking portion is not disengaged on the engagement piece. Correspondingly, the receiver includes a first engagement concavity in which the engagement portion is to be engaged when the cover operating member is held in the locking position, and a second engagement concavity in which the engagement portion is to be engaged when the cover operating member is held in the unlocking position. The locking mechanism may be provided in a plurality of places around the insertion/removal opening in order to prevent the cover from being unlocked by a wrong operation, the cover from opening the insertion/removal opening and thus the disc from coming off.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

The cartridge according to the present invention will be explained herebelow with reference to the accompanying drawings.

Figure 1:
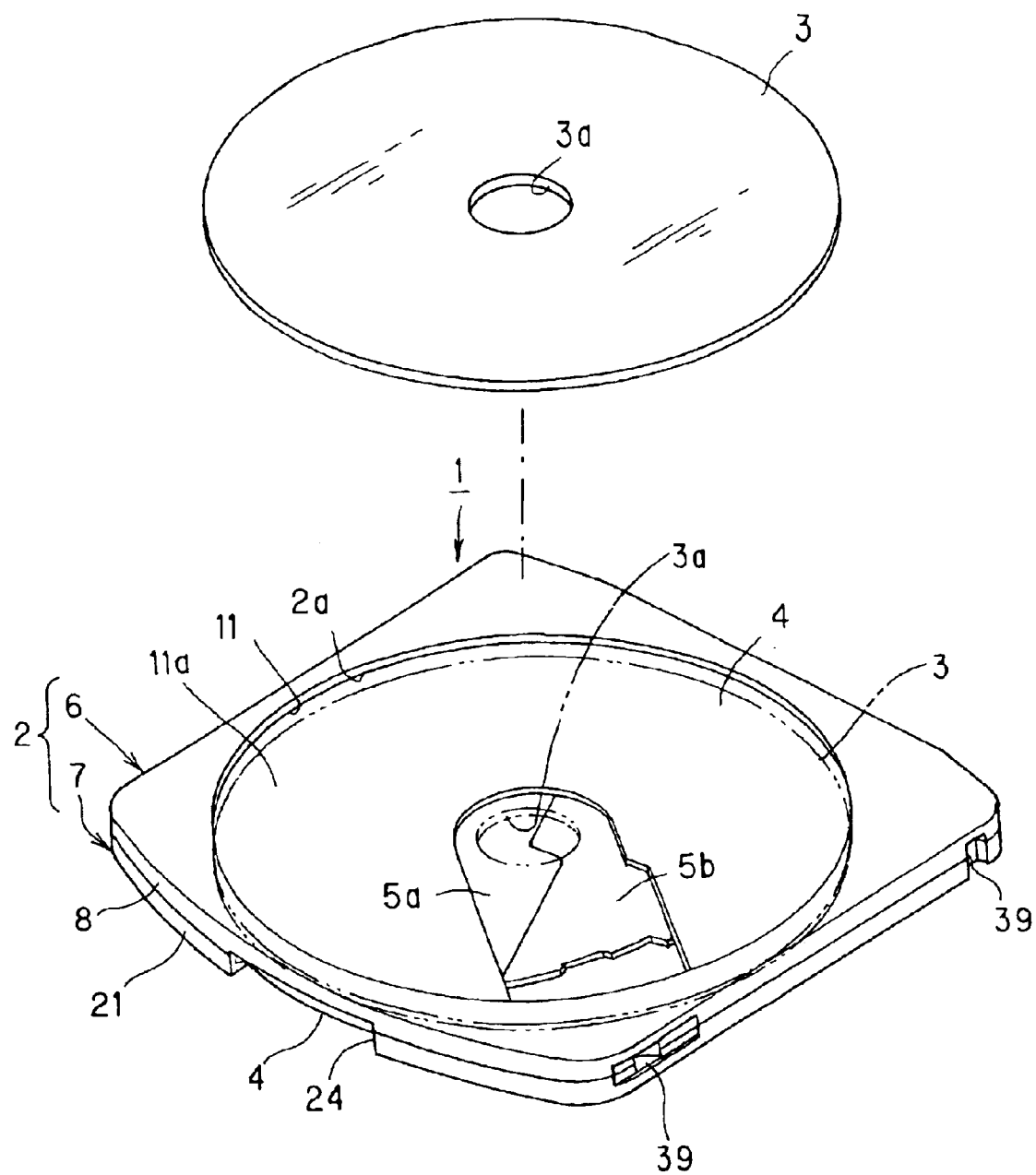
FIG. 1 is an exploded perspective view, from the upper shell, of the cartridge according to the present invention.
Figure 2:
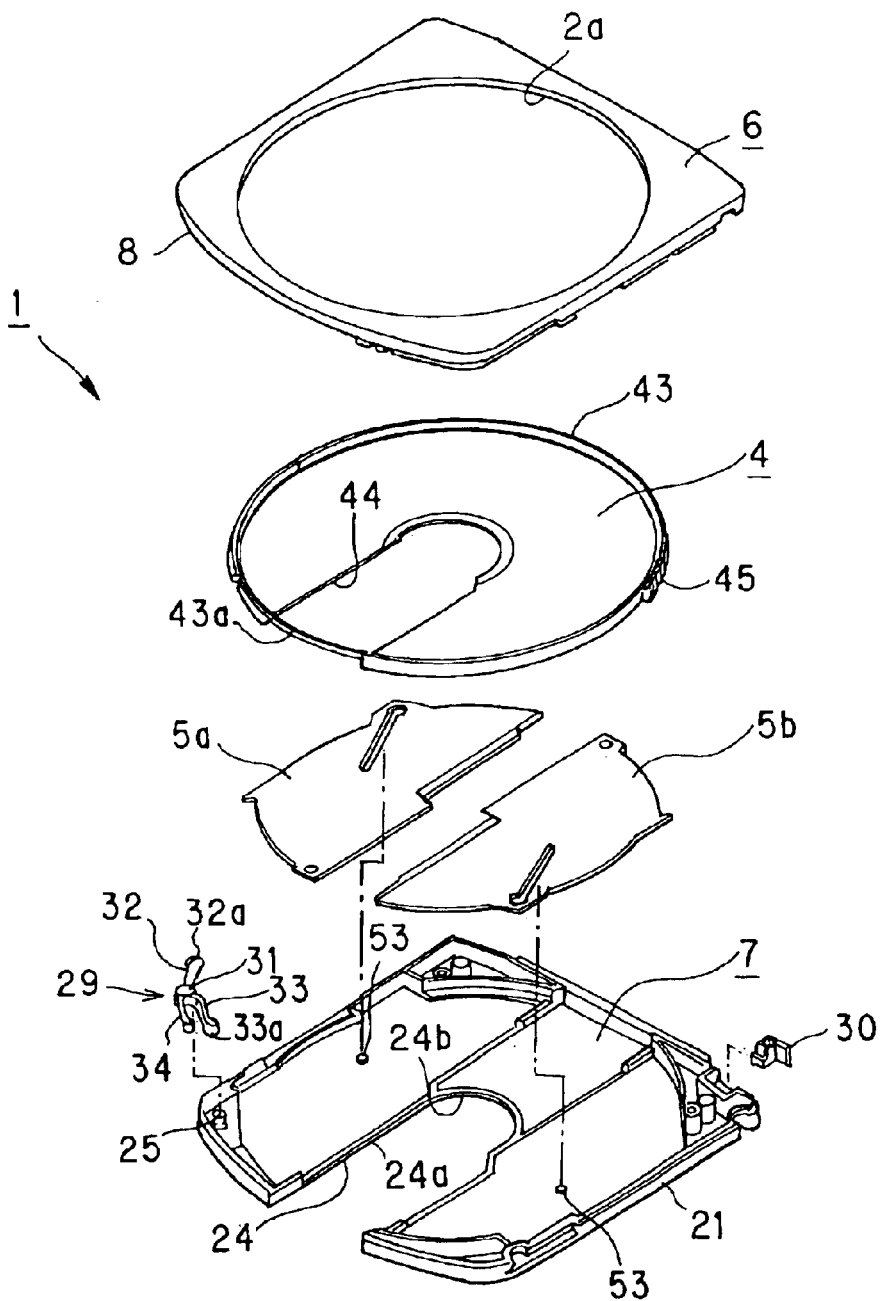
FIG. 2 is a perspective view, from the lower shell, of the cartridge shown in FIG. 1.
Figure 3:
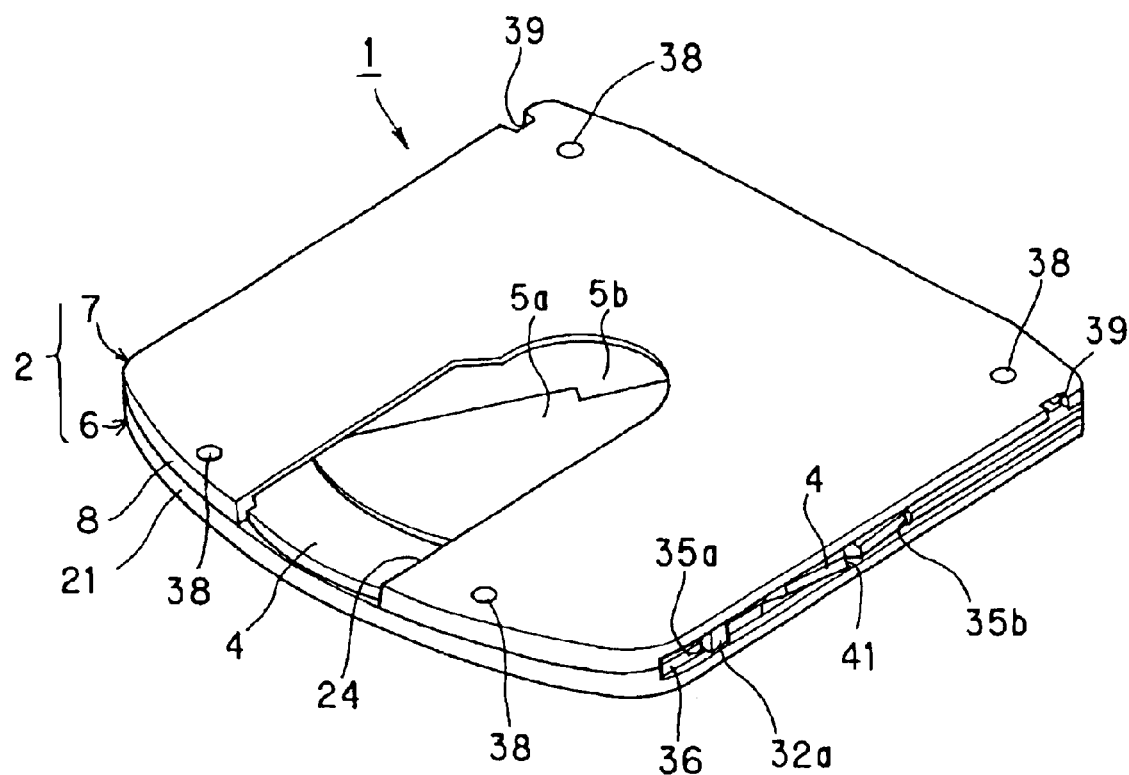
FIG. 3 is a perspective view, from the upper shell, of the cartridge shown in FIG. 1.

The cartridge according to the present invention is generally indicated with a reference 1 through FIGS. 1 to 3. It is used as a caddy for encasing an optical disc therein. As shown in FIGS. 1 to 3, the cartridge 1 houses a cartridge body 2 incorporates an optical disc 3 as a recording medium, an inner rotor 4 serving as a middle shell, and a pair of shutter members 5a and 5b. The cartridge body 2 consists of a pair of shells, upper and lower, 6 and 7, combinable with each other.

As shown in FIG. 2, the optical disc 3 received removably in the cartridge 1 has the same diameter, 12 cm, a CD (compact disc) or DVD (digital versatile disc) for example. It has formed in the center thereof a hole 3 in which a part of the disc rotation drive mechanism of a recorder/player. The optical disc 3 is made of a synthetic resin-made substrate having a predetermined pattern of lands and grooves formed on one side thereof, and includes a reflective layer formed over the predetermined pattern on the substrate to reflect a light beam, a signal recording layer formed, over the reflective layer, from a phase-change material, organic dye recording material or the like, and a light-transmissive layer formed over the signal recording layer. Thus, a light beam is projected from the light-transmissive layer side to the optical disc 3 to record data in the form of such lands and/or grooves. More specifically, a light beam of about 400 nm in wavelength is used to write or read data to the optical disc 3 and the optical pickup of the recorder/player uses an objective lens having a larger numerical aperture (NA) than that of an objective lens used for a CD or DVD, whereby data such as still image data, moving image data, music data, computer-processible data, etc. can be recorded to the optical disc 3.

The discs as a recording medium, which can be encased in the cartridge 1, includes a magneto-optical disc, magnetic disc or the like. Also, the disc may also be a read-only optical disc.

Figure 4:
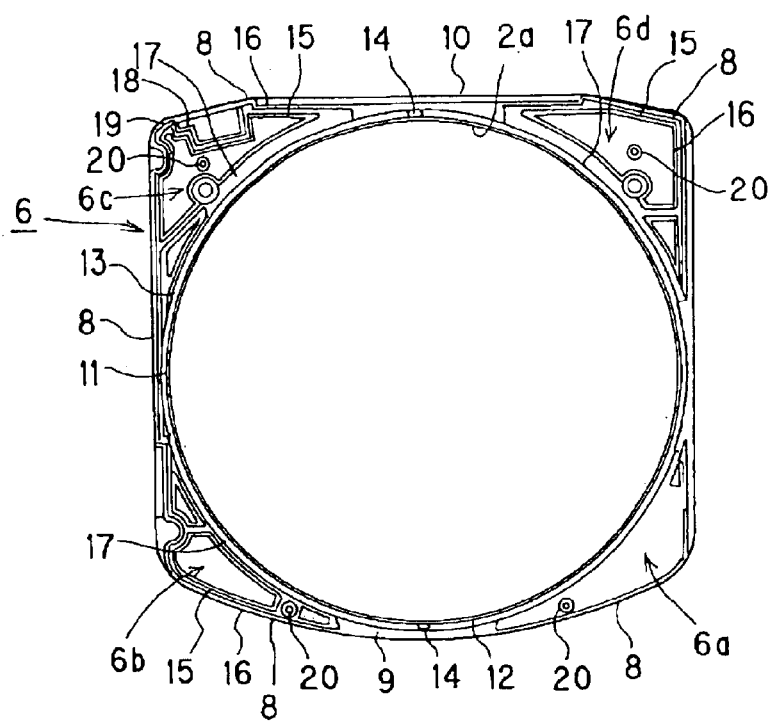
FIG. 4 is a plan view of the inside of the upper shell of the cartridge shown in FIG. 1.

As shown in FIG. 4, the upper shell 6 is formed by injection molding of a thermoplastic synthetic resin such as acrylonitrile butadiene styrene (ABS) for example. The upper shell 6 is formed to have a generally rectangular shape of which the front end which will be first inserted into the recorder/player is shaped like a generally circular arc. The upper shell 6 has formed integrally therewith an outer wall 8 rising from the perimeter of the main side and which defines the lateral face of the cartridge body 2.

The outer wall 8 has formed, by cutting, in the front center thereof a first pickup access opening 9 into which the optical pickup of the recorder/player 70 can be brought. Also, the outer wall 8 has formed, by cutting, in the rear center thereof a positioning concavity 10 with reference to which the upper shell 6 is positioned in relation to the lower shell 7.

Figure 14:
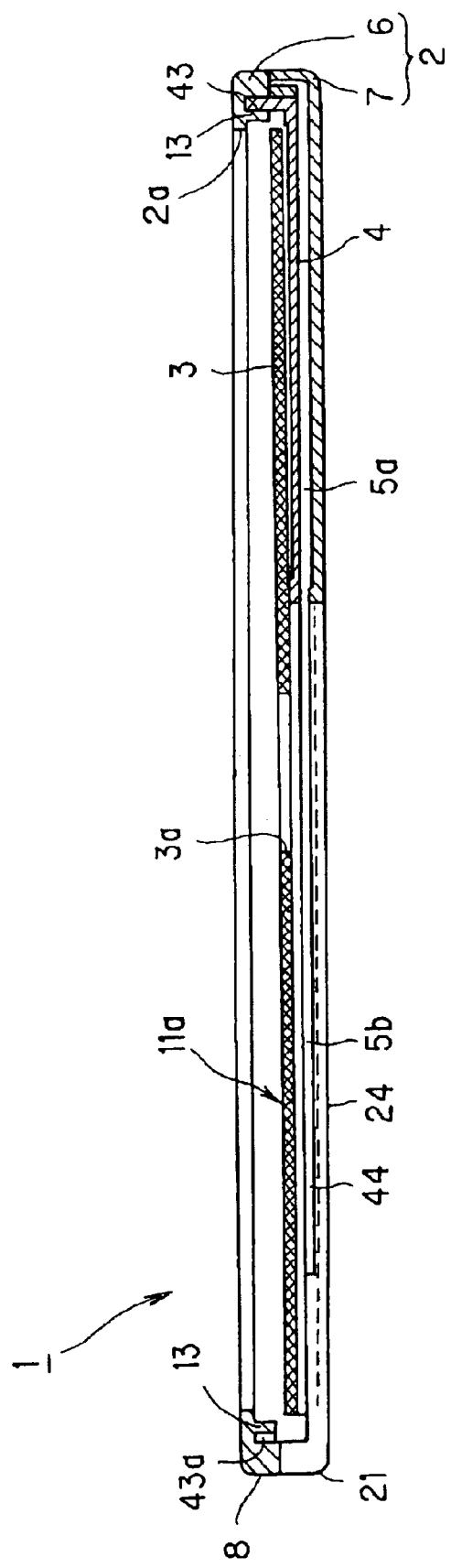
FIG. 14 is a sectional view of the cartridge.

Further, the upper shell 6 has formed therein a generally circular opening whose wall 11 is inscribed in the outer wall 8 and through which the optical disc 3 is inserted or removed. The wall 11 of the insertion/removal opening (will be referred to as "opening wall" hereunder) defines a disc receptacle in which the optical disc 3 is rotatably received. The opening wall 11 has formed, by cutting, in the front center thereof a second pickup access opening 12 into which an optical pickup 75 of the recorder/player 70 which will be described in detail later is to be brought. As shown in FIG. 14, the opening wall 11 defines together with the main side of an inner rotor 4 which will be described in detail later a disc receptacle 11a in which the optical disc 3 is rotatably received.

Between the opening wall 11 and outer wall 8, there is formed a rising wall to surround the opening wall 11. The opening wall 11 and rising wall define together a generally circular guide recess 13 in which the inner rotor 4 is rotatably engaged. The guide recess 13 has formed on the bottom thereof in the front center and rear center a pair of lift-up projections 14 which will move the inner rotor 4 away from the upper shell 6.

As shown, the upper shell 6 has four corners 6a, 6b, 6c and 6d. Of these corners, one front corner 6a forms a locking member receiver in which a locking member to lock the shutter members 5a and 5b is received. At the other corners 6b, 6c and 6d, there are formed rising upper corner walls 15, respectively, which prevent dust from entering the cartridge inside. Each of the upper corner walls 15 is defined between the outer wall 8 and guide recess 13. A first recess 16 is formed between each upper corner wall 15 and outer wall 8, and a second recess 17 is defined between the upper corner wall 15 and guide recess 13.

The upper shell 6 has formed at the rear corner 6c thereof an upper rising wall 18 defining a write protection member receiver in which a write protection member is held. A third recess 19 is defined between the upper rising wall 18 and upper corner wall 15.

The upper shell 6 has formed near each of the corners 6a, 6b, 6c and 6d thereof a positioning pin 20 for coupling to the lower shell 7. Each of the positioning pin 20 has formed in the center thereof a screwing hole.

As shown in FIGS. 1, 2 and 4, the upper shell 6 has formed in the main side thereof the disc insertion/removal opening 2a for replacement of the optical disc 3 held in the disc receptacle 11a. For smooth insertion or removal of the optical disc 3, the insertion/removal opening 2a is formed to have a little larger diameter than the diameter of the optical disc 3. More specifically, the insertion/removal opening 2a is defined by the opening wall 11 of the upper shell 6.

Figure 5:
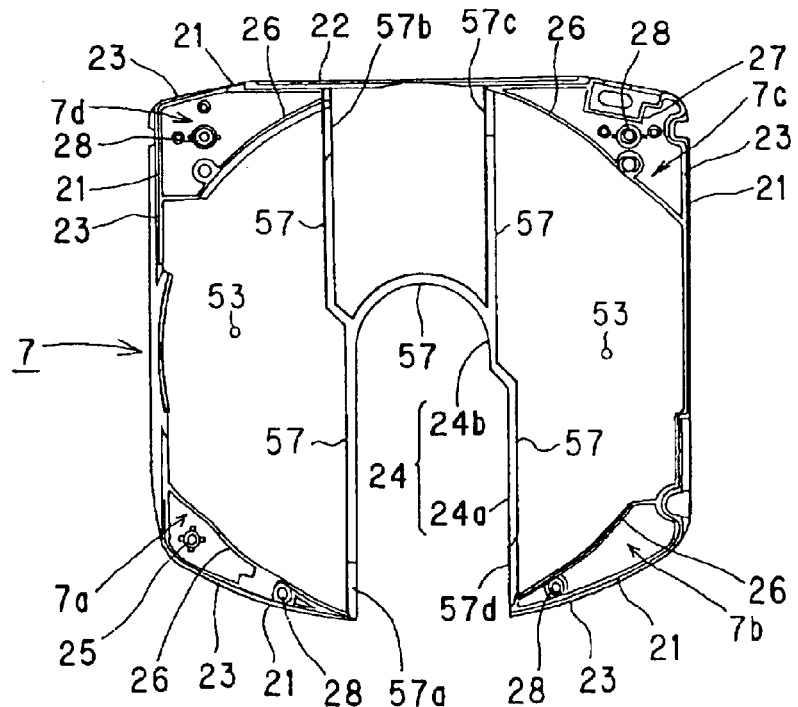
FIG. 5 is a plan view of the inside of the lower shell of the cartridge shown in FIG. 1.

As shown in FIGS. 2, 3 and 5, the lower shell 7 to be coupled to the upper shell 6 constructed as having been described above is formed by injection molding of a thermoplastic synthetic resin such as acrylonitrile butadiene styrene (ABS) for example similarly to the aforementioned upper shell 6. The lower shell 7 is formed to have a main side thereof shaped generally rectangular, whose front end which will first be inserted into the recorder/player is formed to have a generally circular arc shape. The lower shell 7 has formed integrally therewith an outer wall 21 protruding from the perimeter of the main side and which also defines the lateral face of the cartridge body 2.

The outer wall 21 has formed at the rear side thereof a positioning wall 22 which is engaged in the aforementioned positioning concavity 10 of the upper shell 6 to align the upper and lower shells 6 and 7 with each other. Also, the outer wall 21 has formed at the rear side thereof a dustproof wall 23 which is engaged in the first recess 16 of the upper shell 6 to prevent dust or the like from entering the cartridge from between the upper and lower shells 6 and 7.

The lower shell 7 has formed in the front center of the outer wall 21 an opening 24 into which the optical pickup and disc table can be brought. The opening 24 is defined by a generally rectangular write/read opening 24a through which the signal recording surface of the optical disc 3 is partially exposed to outside in a range from the front open end to the inner circumference of the disc, and a disc rotation drive opening 24b contiguous to the write/read opening 24a and through which the central hole 3a in the optical disc 3 is exposed to outside. More specifically, the write/read opening 24a is formed to have sufficient dimensions to bring the optical pickup of the recorder/player to a depth of the cartridge body 2, and the disc rotation drive opening 24b is formed to have sufficient dimensions to bring the disc table include in the disc rotation drive mechanism of the recorder/player 70 can be brought to a depth of the cartridge body 2.

The lower shell 7 has four corners 7a, 7b, 7c and 7d. At one front corner 7a of these corners, forming the locking member receiver, there is formed a projecting pivot 25 to support the locking member 29 pivotably. At the other corners 7b, 7c and 7d except for the front corner 7a, there are formed generally arc-shaped lower corner walls 26, respectively, which are to be engaged in the second recesses 17, respectively, at the aforementioned upper shell 6. Further, at one rear corner 7c, there is formed a rising lower wall 27 which is to be engaged in the third recess 19 at the upper shell 6. The lower shell 7 has formed thereon a generally cylindrical positioning cap 28 which is to be fitted on the positioning pin 20 at the upper shell 6. The positioning cap 28 has formed in the center thereof a through-hole through which a set screw is penetrated.

For coupling the upper and lower shells 6 and 7 to each other, the positioning wall 22 at the lower shell 7 is engaged in the positioning concavity 10 at the upper shell 6, the positioning cap 28 at the lower shell 7 is fitted on the positioning boss 20 at the upper shell 6, and the dustproof wall 23, lower corner wall 26 and rising lower wall 27 at the lower shell 7 are engaged in the first, second and third recesses 16, 17 and 19, respectively, at the upper shell 6. A set screw is screwed into the screw hole in the positioning boss 20 through the through-hole in the positioning cap 28.

As shown in FIG. 14, when the upper and lower shells 6 and 7 are superposed on each other, the cartridge body 2 will have defined by the opening wall 11 and main side of the inner rotor 4 the disc receptacle 11a almost inscribing the perimeter of the cartridge body 2, also defined at one front corner thereof the locking member receiver in which the locking member 29 is pivotably held, and further defined at one rear corner thereof the receiver in which a write protection member 30 is slidably held.

When the inner rotor 4 is in a position where it covers the opening 24 in the cartridge body 2, the locking member 29 locks the inner rotor 4 against rotation. As shown in FIG. 2, the locking member 29 includes an engagement hole 31 in which the pivot 25 of the lower shell 7 is rotatably engaged, an operating piece 32 extending from the engagement hole 31 toward one lateral side of the cartridge body 2, a stop piece 33 extending from the engagement hole 31 toward the disc receptacle 11a, and a spring piece 34 extending from the engagement hole 31 toward the front inner wall of the cartridge body 2. The operating piece 32 has provided at the end thereof an operating projection 32a projected to outside through a locking opening 35a formed in one lateral side of the cartridge body 2. The stop piece 33 has provided at the end thereof a stop projection 33a sliding on a ring portion 43 of the inner rotor 4. The spring piece 34 abuts, in an elastically deformed shape, the front inner side of the cartridge body 2. Therefore, the spring piece 34 forces, by its elasticity, the opening projection 32a of the operating piece 32 in a direction of projecting out of the locking opening 35a, and the stop projection 33a of the stop piece 33 in a direction of abutting the ring portion 43 of the inner rotor 4 and engagement into a second engagement concavity 42 of the inner rotor 4. When the operating projection 32a of the operating piece 32 of the locking member 29 is pressed, the stop piece 33 moved against the elasticity of the spring piece 34 away from the ring portion 43 of the inner rotor 4. Since the locking member 29 is moved away from the ring portion 43, the stop projection 33a is disengaged from the second engagement concavity 42.

When operated along the back of the cartridge body 2, the write protection member 30 can be moved along the back of the cartridge body 2 between a "writing possible" position where it uncovers an access hole and a "data protected" position where it covers the access hole, for example.

As shown in FIG. 3, the cartridge body 2 has a guide recess 36 formed on one lateral side thereof to extend from the front to back of the cartridge body 2. This guide recess 36 is provided to prevent the cartridge 1 from being inserted incorrectly into the recorder/player. In the bottom of the guide recess 36, there are formed a locking opening 35a through which the aforementioned operating projection 32a of the locking member 29 is projected to outside and an inner rotor access opening 35b through which the inner rotor 4 is exposed partially at the perimeter thereof to outside. As shown in FIG. 3, in the bottom of the cartridge body 2, formed by the lower shell 7, there is formed a plurality of positioning concavities 38 to position the cartridge 1 when loaded in the recorder/player 70. Also, on either lateral side of the cartridge body 2, there is formed a plurality of cuts 39 for positioning the cartridge 1 when loaded in the recorder/player and identification of the type of a disc cartridge.

Figure 6:
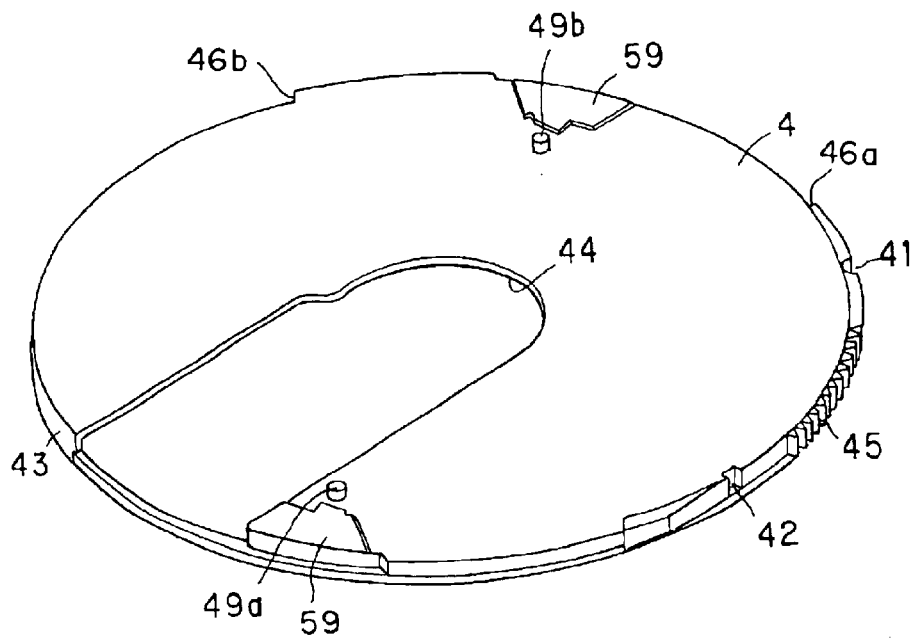
FIG. 6 is a perspective view of the inner rotor.
Figure 7:
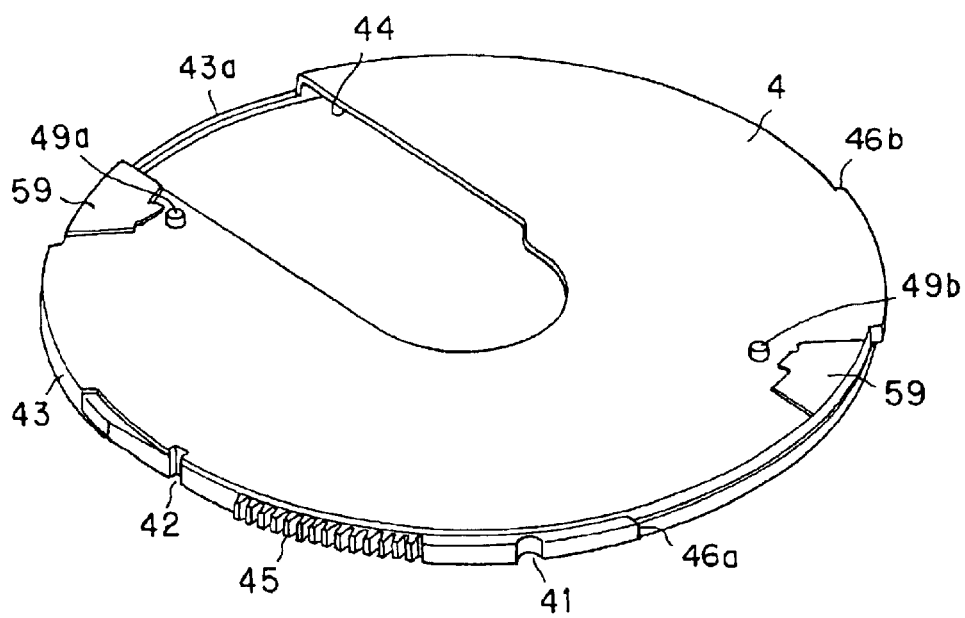
FIG. 7 is a perspective view, from another direction, of the inner rotor.

As shown in FIGS. 6 and 7, the inner rotor 4 is formed by injection molding of a thermoplastic synthetic resin such as polyoxymethylene (POM) for example. When the inner rotor 4 is placed inside the cartridge body 2, it will define the disc receptacle 11a by the main side thereof and opening wall 11 of the upper shell 6 as shown in FIG. 14. The inner rotor 4 is formed to have a generally circular shape whose perimeter is formed as the rising ring portion 43 which is engaged in the aforementioned guide recess 13 of the upper shell 6. With the ring portion 43 engaged in the guide recess 13 of the upper shell 6, the inner rotor 4 is pivotably supported by the cartridge body 2. The inner rotor 4 has formed therein an opening 44 which is generally the same in dimensions as the opening 24 formed in the lower shell 7. A coupling 43a is provided to connect, as a bridge, the ends, cut by the opening 44, of the ring portion 43.

The ring portion 43 has formed on the outer periphery thereof a geared portion 45 which rotates the inner rotor 4. The gear portion 45 extends between a position where the inner rotor 4 is exposed partially at the perimeter thereof to outside through the front portion of the inner rotor access opening 35b when it covers the opening 24 in the lower shell 7 as shown in FIG. 8, and a position where the inner rotor 4 is exposed partially at the perimeter thereof to outside through the rear portion of the inner rotor access opening 35b when it uncovers the opening 24 in the lower shell 7 as shown in FIG. 9.

Also, the inner rotor 4 has formed on the outer periphery thereof at one side of the geared portion 45 a first engagement concavity 41 in which a first engagement projection of a shutter releasing member included in a shutter release mechanism at the recorder/player, and at the other side of the geared portion 45 a second engagement concavity 42 in which a second engagement projection of the shutter releasing member is engaged. These engagement concavities 41 and 42 are exposed along with the geared portion 45 to outside through the inner rotor access opening 35b. When the cartridge 1 is loaded into the recorder/player, the first engagement concavity 41 has first engaged therein the first engagement projection of the shutter releasing member. When the pair of shutter members 5a and 5b is in the closed position, the second engagement concavity 42 has engaged therein the stop projections 33a of the locking member 29. When the pair of shutter members 5a and 5b moved to the position where it uncovers the openings 24 and 44, the second engagement concavity 42 will receive the second engagement projection of the shutter releasing member.

The ring portion 43 has a pair of rotation limiting projections 46a and 46b formed spaced a predetermined interval on the outer periphery thereof to limit the rotation of the inner rotor 4. On the other hand, the upper shell 6 has formed between the guide recess 13 and upper corner wall 15 a pair of limiters 47a and 47b which abut the pair of inner-rotor rotation limiting projections 46a and 46b, respectively. As shown in FIG. 9, when the inner rotor 4 rotates in a direction of uncovering the opening 24, one of the rotation limiting projections (46a) abuts one of the pair of limiters (47a) to prevent a further rotation of the inner rotor 4. When the inner rotor 4 is thus limited from rotating in this direction, it is in a position where it uncovers the opening 24 and the opening 44 in the inner rotor 4 is nearly aligned with the opening 24 in the cartridge body 2. On the other hand, as shown in FIG. 8, when the inner rotor 4 rotates in a direction of covering the opening 24, the other inner-rotor rotation limiting projection 46b abuts the other limiter 47b to prevent a further rotation of the inner rotor 4. When the inner rotor 4 is limited against rotation in this direction, it is in a position where it covers the opening 24 and the opening 44 in the inner rotor 4 is most inclined in relation to the opening 24 of the cartridge body 2.

Figure 8:
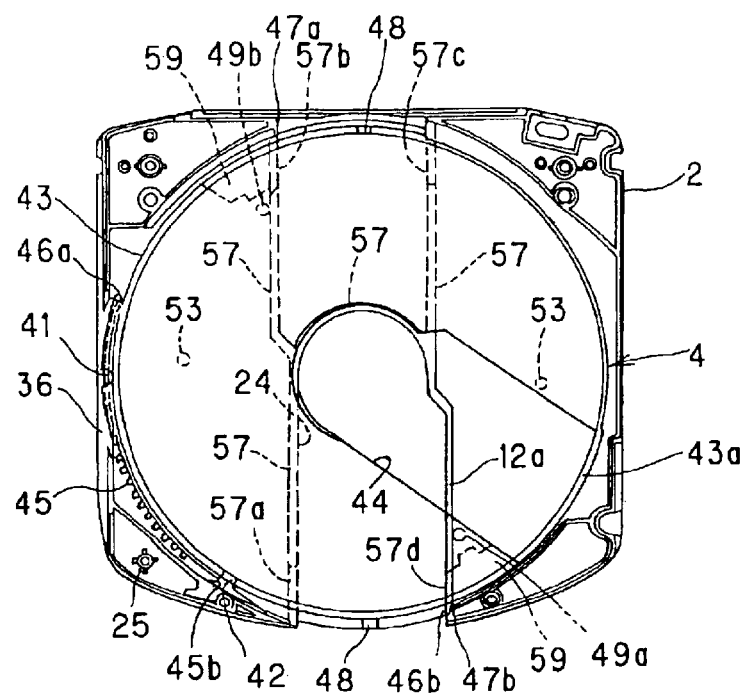
FIG. 8 is a plan view of the inner rotor in a position where it covers the opening in the lower shell.
Figure 9:
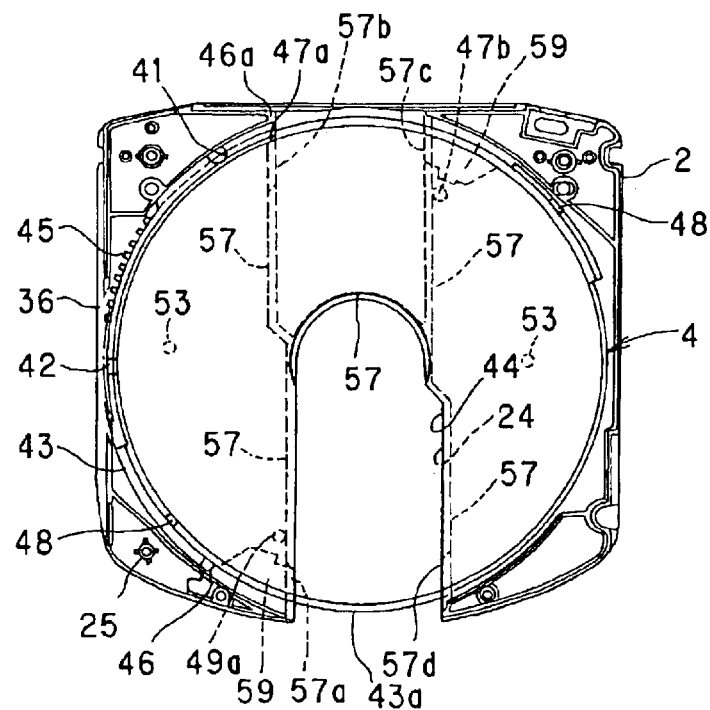
FIG. 9 is a plan view of the inner rotor in a position where it uncovers the opening in the lower shell.

As shown in FIGS. 8 and 9, the ring portion 43 has formed thereon a pair of lift-up projections 48 which slide on the aforementioned pair of lift-up projections 14 formed on the bottom of the guide recess 13. When the inner rotor 4 is close to the position where it covers the opening 24, the lift-up projections 48 slide onto the lift-up projections 14, respectively, in the guide recess 13 and thus lift up the inner rotor 4 away from the upper shell 6.

As shown in FIGS. 6 to 9, the inner rotor 4 has formed on the main side thereof opposite to that on which the ring portions 43 are formed a pair of projecting pivots 49a and 49b which support the pair of shutter members 5a and 5b rotatably. The pair of pivots is located in positions, respectively, symmetrical with the center of the inner rotor 4, that is, 180 deg. out of phase from each other.

Figure 10:
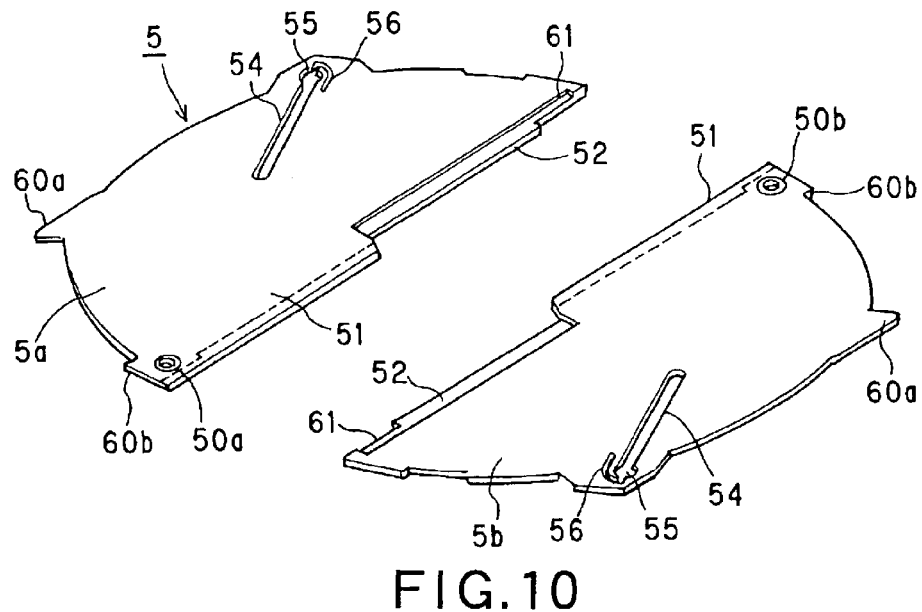
FIG. 10 is a perspective view, from the upper shell, of the pair of shutter members.
Figure 11:
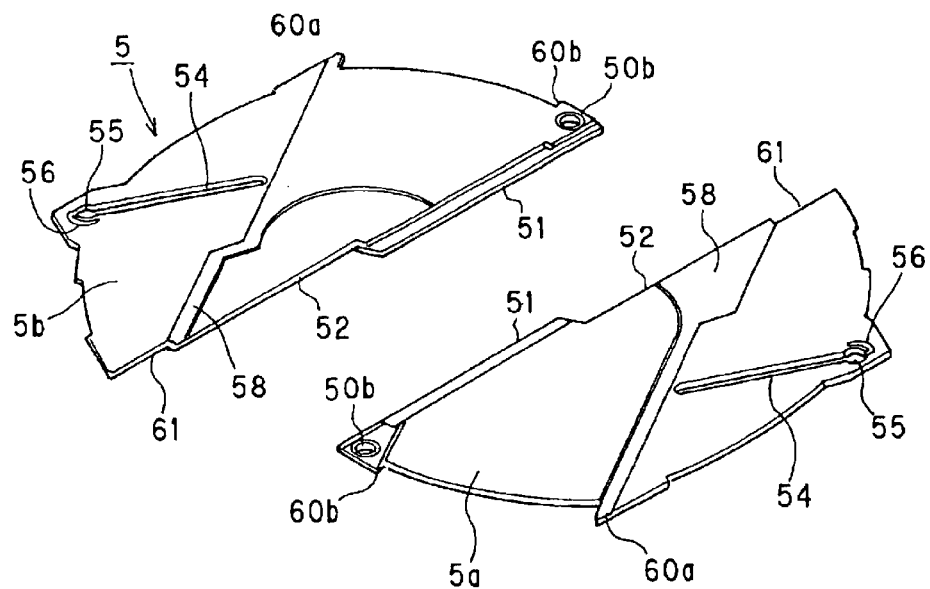
FIG. 11 is a perspective view, from the lower shell, of the pair of shutter members.

As shown in FIGS. 10 and 11, the shutter members 5a and 5b placed on the above inner rotor 4 to cover and uncover the openings 44 and 44a in the inner rotor 4 have symmetrical shapes and are installed on the pair of pivots 49a and 49b, respectively, of the inner rotor 4 to be pivotable with a phase difference of 180 deg. between them. It should be noted that since the pair of shutter members 5a and 5b have many identical parts, they will collectively be referred to simply as "shutter member 5" and also the identical parts will be indicated with the same references, respectively.

Similarly to the inner rotor 4, the shutter members 5a and 5b are formed by injection molding of a thermoplastic synthetic resin such as polyoxymethylene (POM) for example. The shutter member 5 is formed to have a generally meniscal shape whose base portion has formed therein an engagement hole 50a or 50b in which the aforementioned pivot 49a or 49b of the inner rotor 4 is pivotably engaged.

Figure 12:
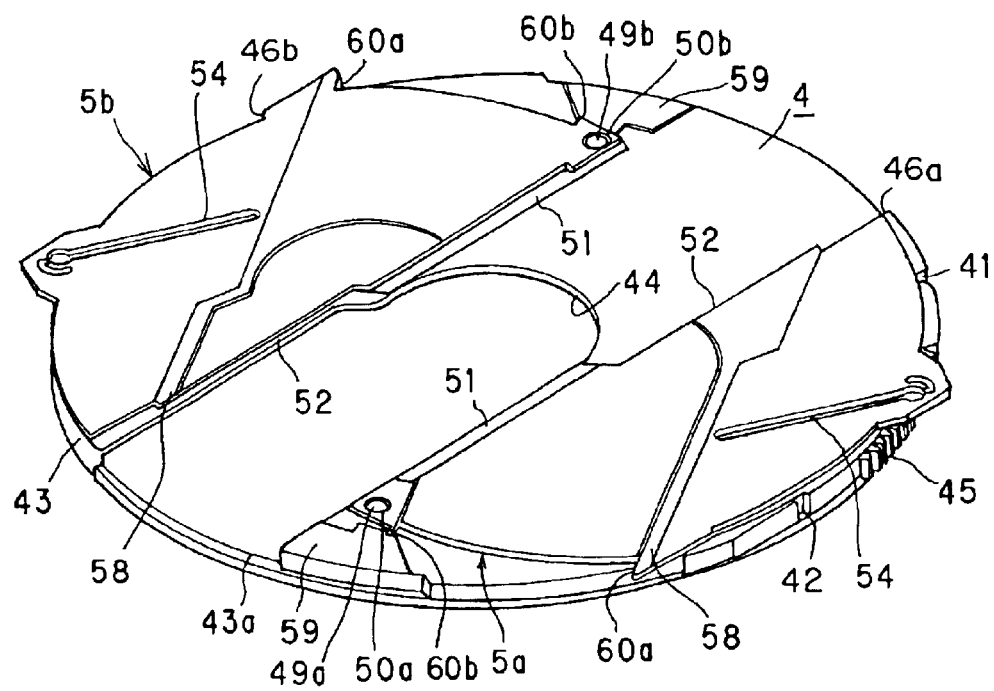
FIG. 12 is a perspective view of the pair of shutter members in a position where it uncovers the opening in the inner rotor.
Figure 13:
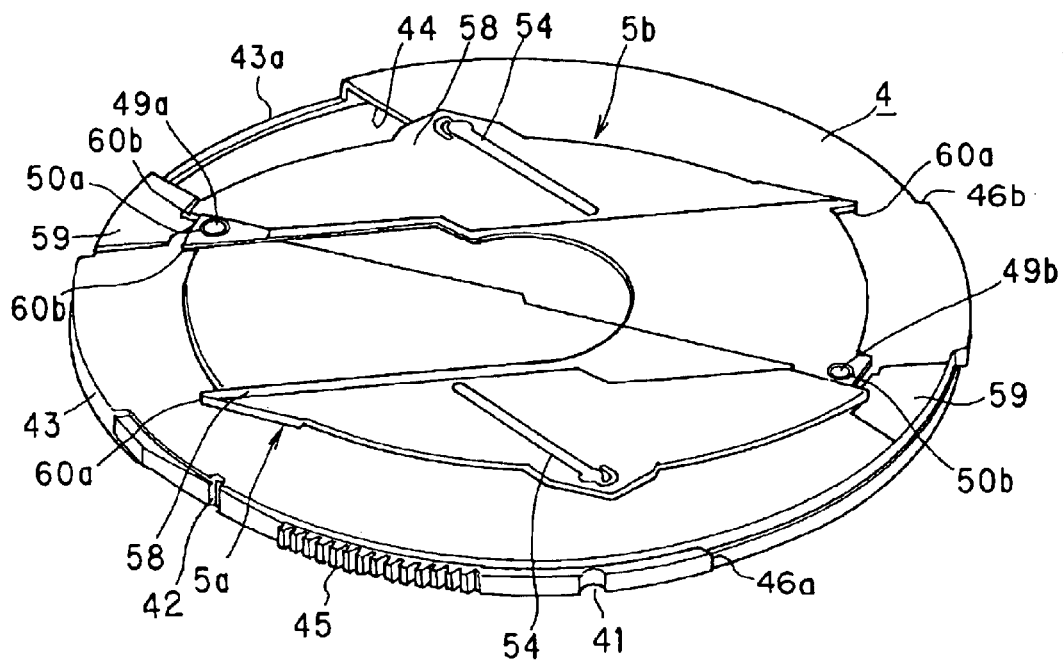
FIG. 13 is a perspective view of the pair of shutter members in a position where it covers the opening in the inner rotor.

Also, each of the shutter members 5a and 5b has formed on the string-like butting face thereof a first engagement potion 51 extending from the central portion toward the base and a second engagement portion 52 extending from the central portion toward the free end. Of the first and second engagement portions, the first one 51 is beveled at the side of the lower shell 7, while the second engagement portion 52 is beveled at the side of the upper shell 6. As shown in FIGS. 12 and 13, the shutter members 5a and 5b in pair are pivoted about the pivots 49a and 49b, respectively, on the inner rotor 4 toward or away from each other, the first engagement portion 51 of one of the shutter members (5a) engages on the second engagement portion 52 of the other shutter member 5b, while the first engagement portion 51 of the other shutter member 5b engages on the second engagement portion 52 of the one shutter member 5a.

Each of the shutter members 5a and 5b has formed therein a guide slot 54 in which one of a pair of guide pins 53 formed on the inner surface of the lower shell 7 shown in FIG. 5. The guide slot 54 extends over a predetermined length from the midpoint of the string-like butting face toward the engagement hole 50a or 50b such that the shutter member 5a or 5b can be turned between the covered and uncovered positions of the opening 44, as shown in FIGS. 10 and 11. At the end of the guide slot 54 near the outer perimeter of the inner rotor 4, there are formed an engagement hole 55 and an elastic pushing piece 56. When the shutter member 5a or 5b is in the covered position thereof, the guide pin 53 of the lower shell 7 will be engaged in the engagement hole 55 and at the same time the elastic pushing piece 56 will push the guide pin 53 engaged in the engagement hole 55.

Note that as shown in FIG. 5, a dustproof rib 57 is formed all around the opening 24 in the lower shell 7 as well as along extensions of lateral edges of the opening 24 to prevent dust or the like from entering the cartridge 1. The dustproof rib 57 includes auxiliary ribs 57a, 57b, 57c and 57d whose end portions joining the outer wall 21 of the lower shell 7 are as high as the outer wall 21. When the shutter members 5a and 5b cover the opening 44, the dustproof rib 57 is engaged in dustproof recesses 58 formed in the shutter members 5a and 5b, respectively. As shown in FIGS. 12 and 13, the inner rotor 4 has also formed in the vicinity of each of the pair of pivots 49a and 49b thereof a disengagement projection 59 which cancels the engagement between the dustproof rib 57 and dustproof recesses 58. Each of these disengagement projections 59 in pair is formed as generally high as the dustproof rib 57. When the shutter member 5 moved from the position where it covers the opening 44 to the position where it uncovers the opening 44, the disengagement projection 59 cancels the engagement between the dustproof rib 57 and dustproof recesses 58.

As shown in FIGS. 10 and 11, each of the pair of shutter members 5a and 5b has formed thereon a first engagement piece 60a and second engagement piece 60b. When the pair of shutter members 5a and 5b is in the position where they cover the openings, the first engagement projection 60a engages on the auxiliary ribs 57a and 57c included in the dustproof rib 57, while the second engagement projection 60b engages on the other auxiliary ribs 57b and 57d. Each of the pair of shutter members 5a and 5b has formed in the free end portion of the second engagement portion 52 thereof a cut 61 in which the auxiliary ribs 57b and 57d included in the dustproof rib 57 are engaged.

The cartridge 1 constructed as having been described above is assembled as will be described below:

To assemble the cartridge 1, the upper shell 6 is first placed with the inner surface being directed upward, and then the ring portion 43 of the inner rotor 4 is engaged in the guide recess 13 of the upper shell 6. The inner rotor 4 should be pre-positioned in relation to the upper shell 6 such that the opening 44 in the inner rotor 4 and the first and second pickup access openings 9 and 12 in the upper shell 6 are aligned with each other.

Next, the pair of shutter members 5a and 5b is installed to the inner rotor 4. More specifically, with the pair of shutter members 5a and 5b being butted at the butting faces thereof to each other, the pivots 49a and 49b of the inner rotor 4 are engaged into the engagement holes 50a and 50b. Thereby, the shutter members 5a and 5b in pair are installed to be pivotable about the pivots 49a and 49b, respectively, of the inner rotor 4. The pair of shutter members 5a and 5b is pre-positioned in relation to the inner rotor 4 so that the butting faces of the pair of shutter members 5a and 5b come to the edges of the opening 44 in the inner rotor 4. At the same time or before or after the pre-positioning, the locking member 29 the pivot 25 on the lower shell 4 is inserted in the engagement hole 31 in the locking member 29 is installed, and also the write protection member 30 is disposed in position.

Next, the lower shell 7 is joined to the upper shell 6. More specifically, with the outer walls 8 and 21 of the upper and lower shells 6 and 7, respectively, being butted to each other, the positioning wall 22 of the lower shell 7 is engaged in to the positioning concavity 10 of the upper shell 6. Thus, the positioning cap 28 at the lower shell 7 will be fitted on the coupling pin 20 at the upper shell 6. Also, the dustproof wall 23, lower corner wall 26 and rising lower wall 27 at the lower shell 7 will be engaged in the first, second and third recesses 16, 17 and 19, respectively, at the upper shell 6.

The guide pin 53 at the lower shell 7 will be engaged in the guide slot 54 in each of the shutter members 5a and 5b. By pre-positioning the pair of shutter members 5a and 5b in relation to the inner rotor 4, the lower shell 7 and pair of shutter members 5a and 5b can easily be positioned in relation to each other at this time. Next, the set screw is screwed into the screw hole in the positioning pin 20 through the through-hole in the coupling cap 28. Thus, the lower shell 7 is joined to the upper shell 6 and thus the cartridge body 2 is formed. At this time, the inner rotor 4 and pair of shutter members 5a and 5b are in their respective positions where they do not cover the openings 24 and 44, respectively.

Next, the geared portion 45 is operated to rotate the inner rotor 4 in a direction of covering the openings 24 and 44, whereby the pair of shutter members 5a and 5b will cover the opening 24 in the cartridge body 2. With the above operations, the cartridge 1 is completely assembled. As seen from the foregoing explanation, it will be clear that the cartridge 1 according to the present invention uses a reduced number of parts and can be assembled extremely easily. Since no spring is used as a part, the cartridge 1 can easily be assembled.

The lower shall 7 may be fixed to the upper shell 6 not only with the aforementioned set screw, but the upper and lower shells 6 and 7 may be joined integrally to each other with an adhesive, ultrasonic welding or the like.

Figure 15:
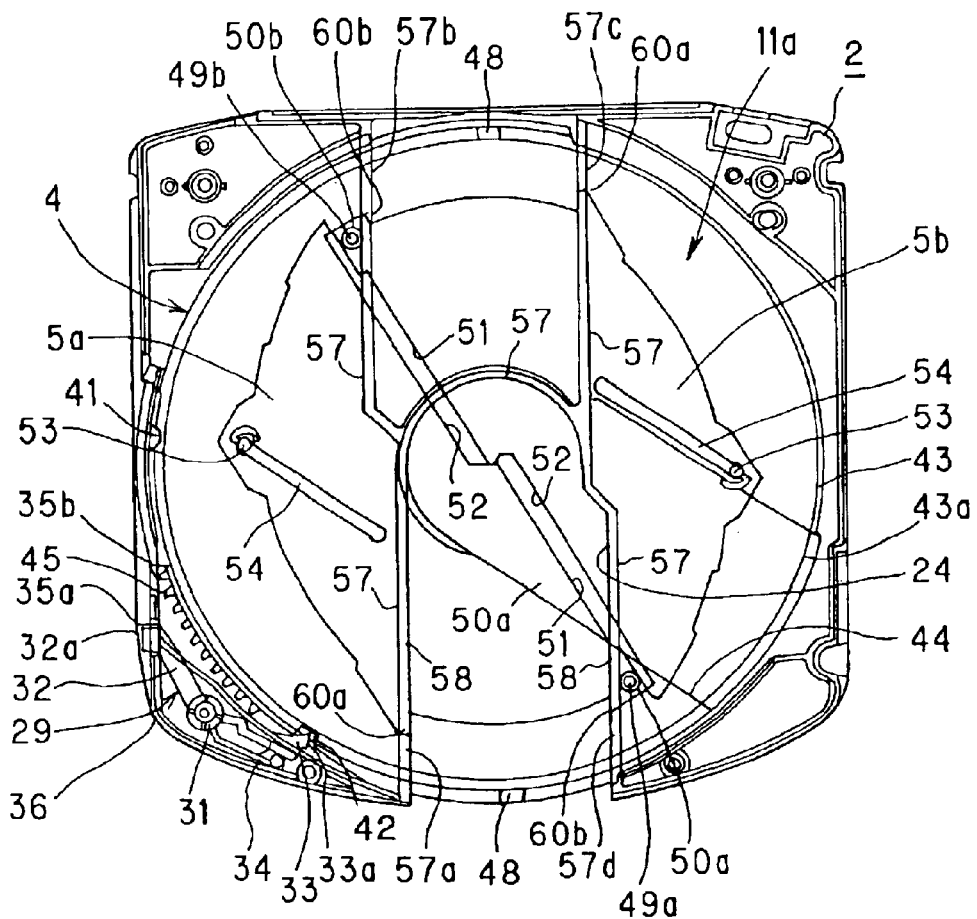
FIG. 15 is a plan view of the cartridge in which the pair of shutter members covers the opening in the lower shell.
Figure 16:
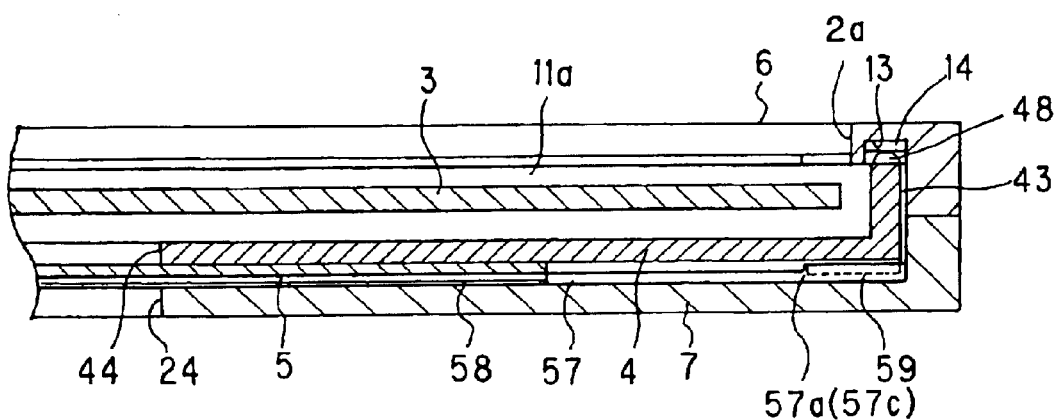
FIG. 16 is a segmentary sectional view of the cartridge, showing that the lift-up projections of the inner rotor are engaged on those of the upper shell.

The cartridge 1 constructed as having been described in the foregoing is in a state as shown in FIGS. 1, 3 and 15. More particularly, with the stop projection 33a of the locking member 29 being engaged in the second engagement concavity 42 of the inner rotor 4, the pair of shutter members 5a and 5b is locked in the position where they cover the openings 24 and 44. At this time, the first engagement concavity 41 of the inner rotor 4 is exposed to outside through the inner rotor access opening 35b, and the opening projection 32a of the locking member 29 is exposed to outside through the locking opening 35a. When the cartridge 1 is loaded into the recorder/player, the shutter releasing mechanism at the recorder/player side will release the shutter locking so that the shutter members 5a and 5b can be pivoted. As shown in FIG. 16, the lift-up projection 14 slides onto the lift-up projection 48, so that the pair of shutter member 5a and 5b will be caught at both the sides thereof between the inner rotor 4 and lower shell 7. Therefore, the pair of shutter members 5a and 5b positively cover the openings 24 and 44 when the cartridge 1 is not in use. In this condition, the optical disc 3 can be introduced into, or removed from, the disc receptacle 11a of the cartridge 1 through the insertion/removal opening 2a in the upper shell 6. Then the cartridge 1 will have a user's desired optical disc 3 set therein and be loaded into the recorder/player.

Figure 17:
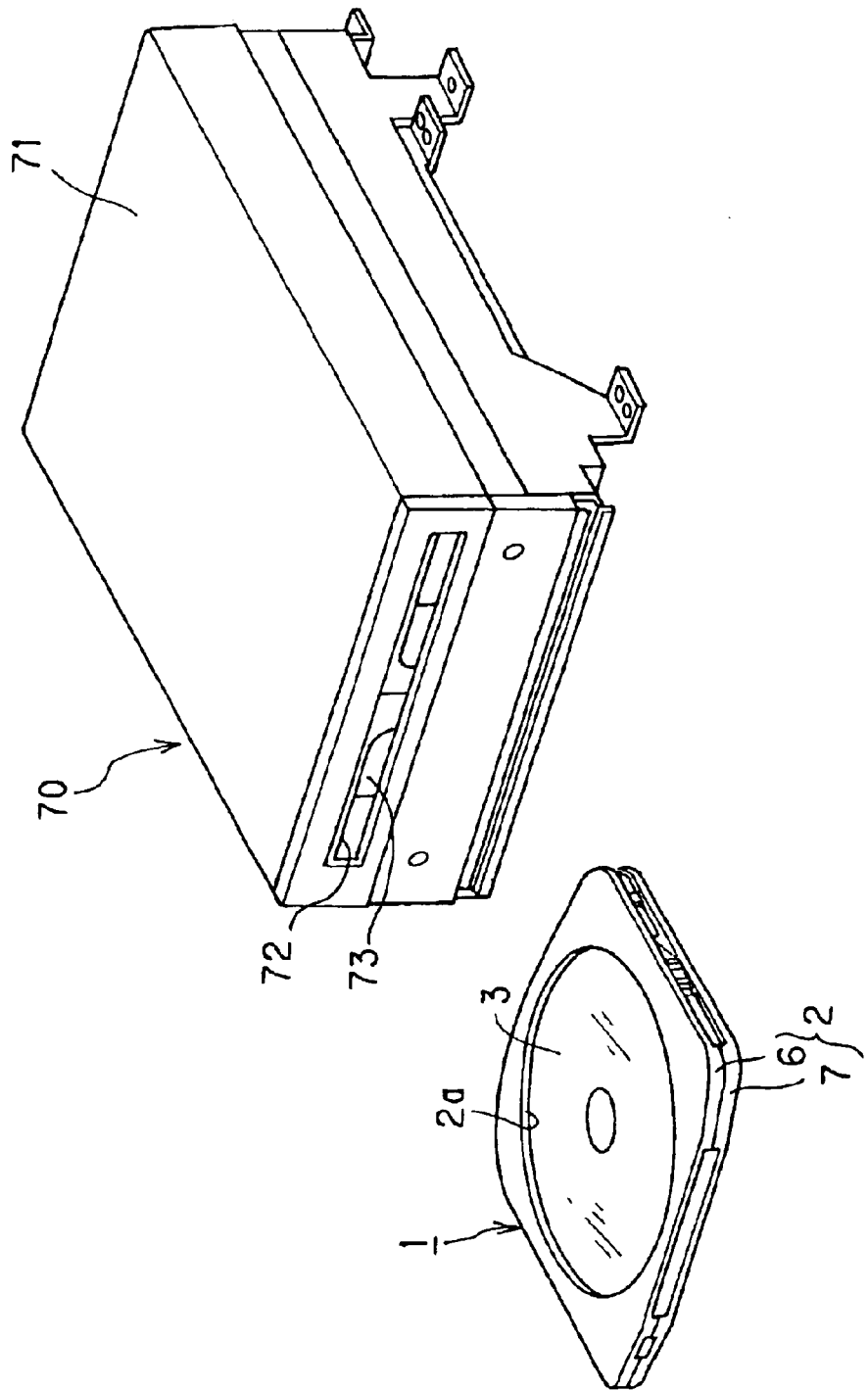
FIG. 17 is a perspective view of a recorder/player for use with the cartridge.

The cartridge 1 constructed as having been described in the foregoing is used being loaded in a disc recorder/player 70 shown in FIG. 17. The recorder/player 70 is designed to use a disc cartridge having pre-encased therein the optical disc 3 and thus has no disc insertion/removal opening 2a formed in the upper shell 6. The cartridge 1 according to the present invention can be loaded in this recorder/player.

The recorder/player 70 will be explained herebelow with reference to FIG. 17. The recorder/player 70 includes a casing 71 having disposed therein a main unit incorporating a loader for the cartridge 1. The casing 71 has formed in the front side thereof a disc slot 72 through which the cartridge 1 is to be inserted. The disc slot 72 is closed by a cover 73. When the cover 73 is pressed by the front end of the cartridge 1, it is pivoted inwardly to uncover the disc slot 72. Thus, the cartridge 1 can be introduced into the disc loader in the casing 71.

Figure 18:
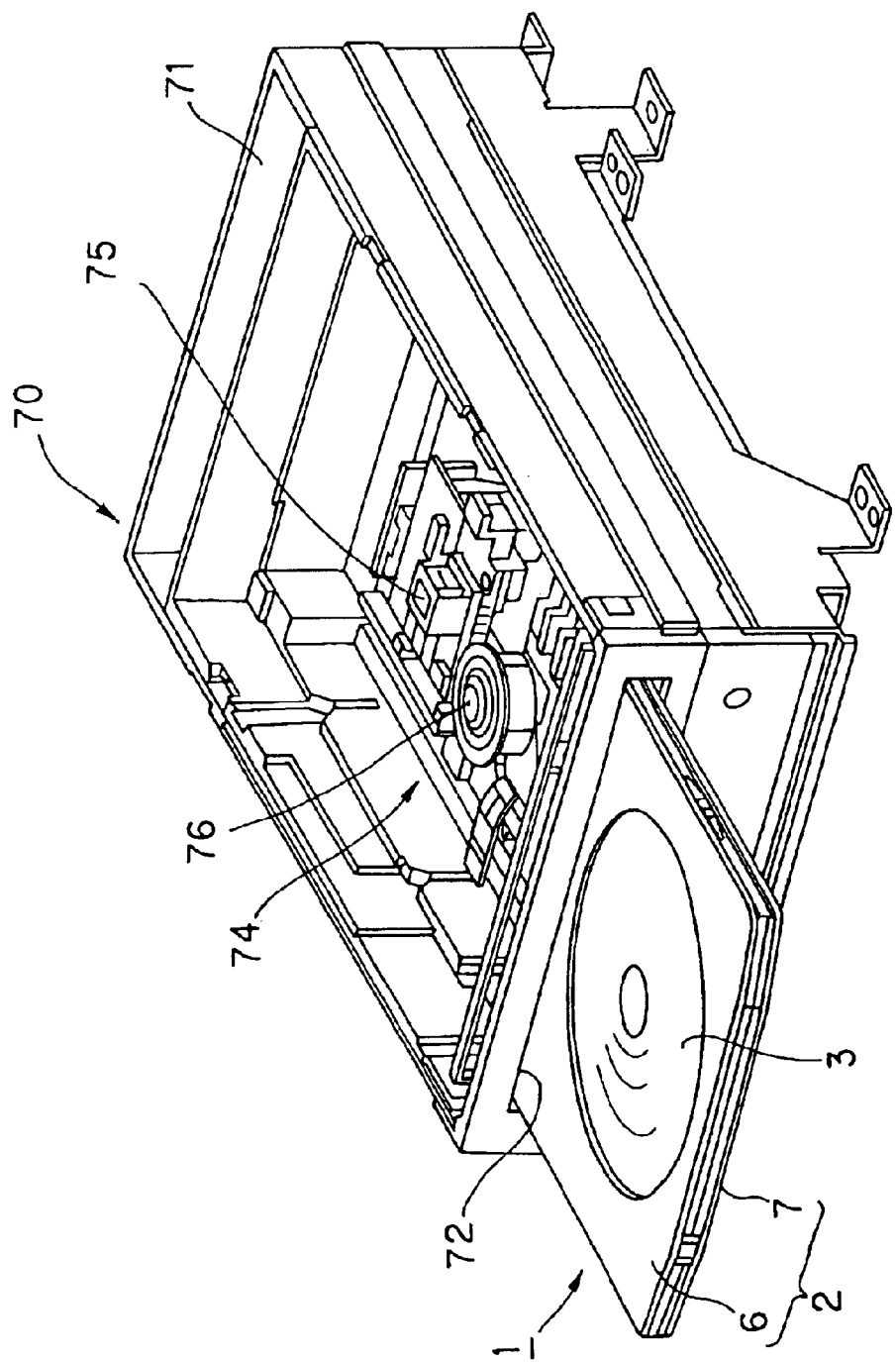
FIG. 18 is an explanatory perspective view of the loader provided in the disc recorder/player in FIG. 17.

The main unit disposed inside the casing 71 has a loading mechanism to load the cartridge 1 into the disc loader, as shown in FIG. 18. The cartridge 1, having been inserted first at the front end thereof into the casing 71 through the disc slot 72, is automatically pulled to the disc loader. The disc loader includes a disc rotation drive mechanism 74 to rotate the optical disc 3 at CLV (constant linear velocity), CAV (constant angular velocity) or at a combination of them, and optical pickup 75. The disc rotation drive mechanism 74 includes a disc table 76 installed to the drive shaft of a spindle motor rotatably with the drive shaft, a clamping plate to catch the optical disc 3 and rotate the optical disc along with the disc table 76. When the cartridge 1 is inserted into place in the disc loader, the disc table 76 will be engaged in a central hole 3a of the optical disc 3 while holding the optical disc 3 in cooperation with the clamping plate. Once the spindle motor is put into run, the disc table 76 rotates the optical disc 3 at CLV or CAV.

The optical pickup 75 converges a light beam of about 400 nm in wavelength, emitted from a semiconductor laser, through an objective lens, and focuses the light beam on the signal recording surface of the optical disc 3 to write information signal to the optical disc 3, and detects a return light reflected from the signal recording surface to read information signal from the optical disc 3.

Figure 19:
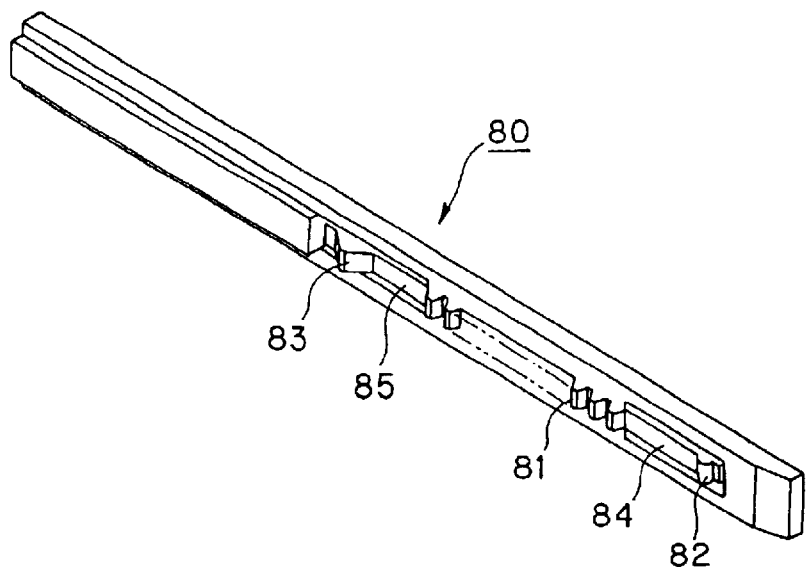
FIG. 19 is a perspective view of the shutter releasing member.

The disc loader in the recorder/player 70 includes a shutter releasing member 80 included in a shutter releasing mechanism which rotates the inner rotor 4 when the cartridge 1 is set in the disc loader and pivots the shutter members 5a and 5b. As shown in FIG. 19, the shutter releasing member 80 includes a rack 81 which is to be in mesh with the geared portion 45 of the inner rotor 4, a first engagement projection 82 provided at the end of the rack 81 for initial operation of the inner rotor 4, a second engagement projection 83 provided at the base of the track 81 for stopping the inner rotor 4, etc. The rack 81 has generally as many teeth as the geared portion 45 has.

The first engagement projection 82 is provided at the end of a first elastic member 84 provided at one end of the rack 81, and the second engagement projection 83 is provided at the end of a second elastic member 85 provided at the other end of the rack 81, such that they can positively be engaged in the engagement concavities 41 and 42, respectively, in the inner rotor 4. Such a shutter releasing member 80 may be adapted to move straight in relation to the cartridge 1 set in the disc loader and operate the shutter members 5a and 5b. Alternatively, the shutter releasing member 80 may be fixed to the main unit to operate the shutter members 5a and 5b as the cartridge 1 is moved to the disc loader.

Figure 20:
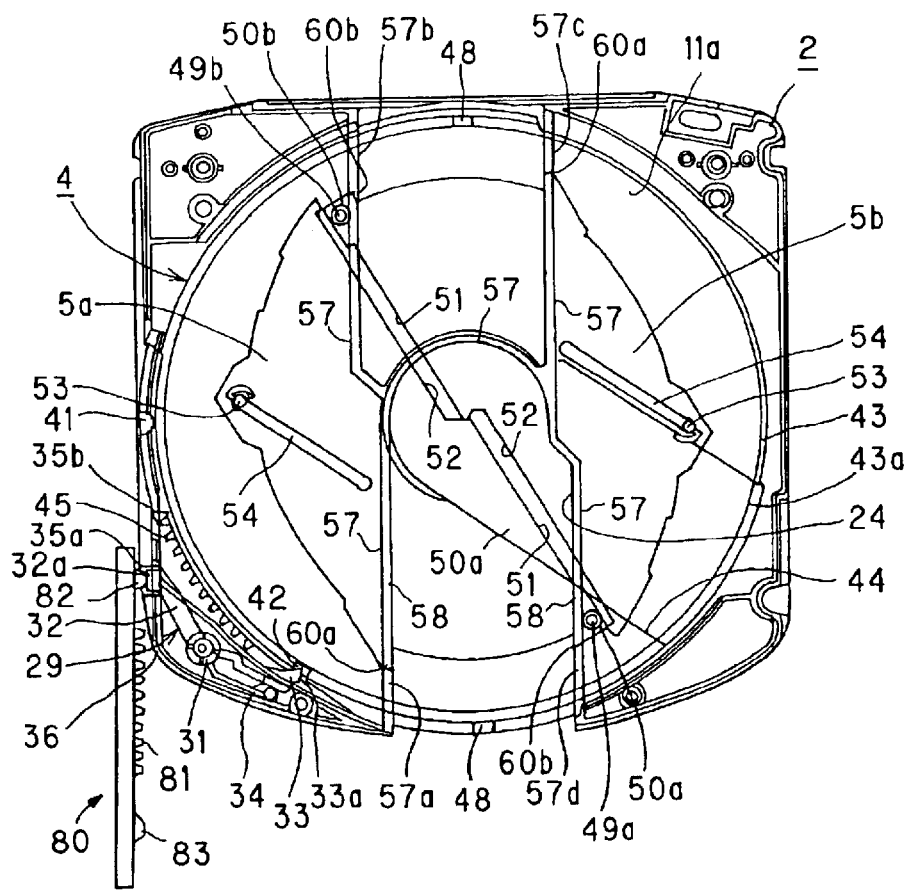
FIG. 20 is a plan view of the pair of shutter members being initially released.

The cartridge 1 is inserted into the disc slot 72 while pushing at the front end thereof the cover 73 as shown in FIG. 18. Once the cartridge 1 is inserted, the shutter members 5a and 5b are pressed by the cartridge 1 to start being released or opened. First, the shutter releasing member 80 is engaged in the guide recess 36 in the cartridge 1 and the first engagement projection 82 presses the opening projection 32a of the locking member 29, accessible from outside through the locking opening 35a formed in the guide recess 36, as shown in FIG. 20. Thus, the locking member 29 pivots about the pivot 25 and stop projection 33a is disengaged from the second engagement concavity 42 in the inner rotor 4. As a result, the inner rotor 4 is unlocked and thus enabled to rotate.

Figure 21:
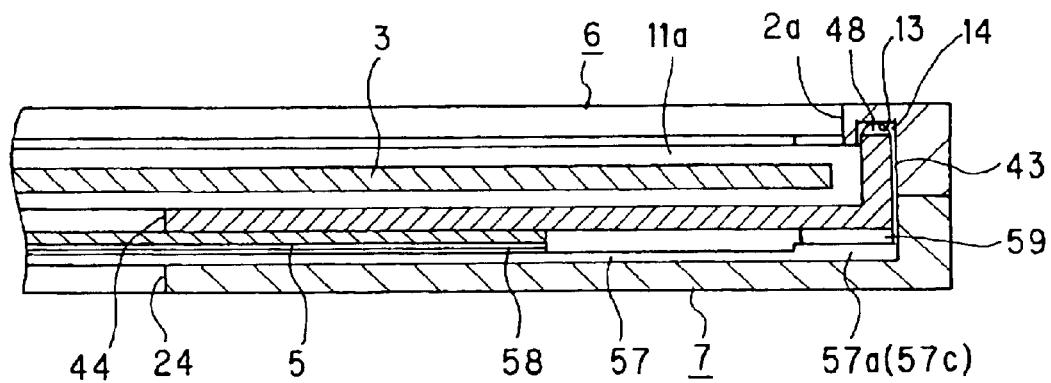
FIG. 21 is a segmentary sectional view of the cartridge, showing that the lift-up projections of the inner rotor are disengaged from those of the upper shell.
Figure 22:
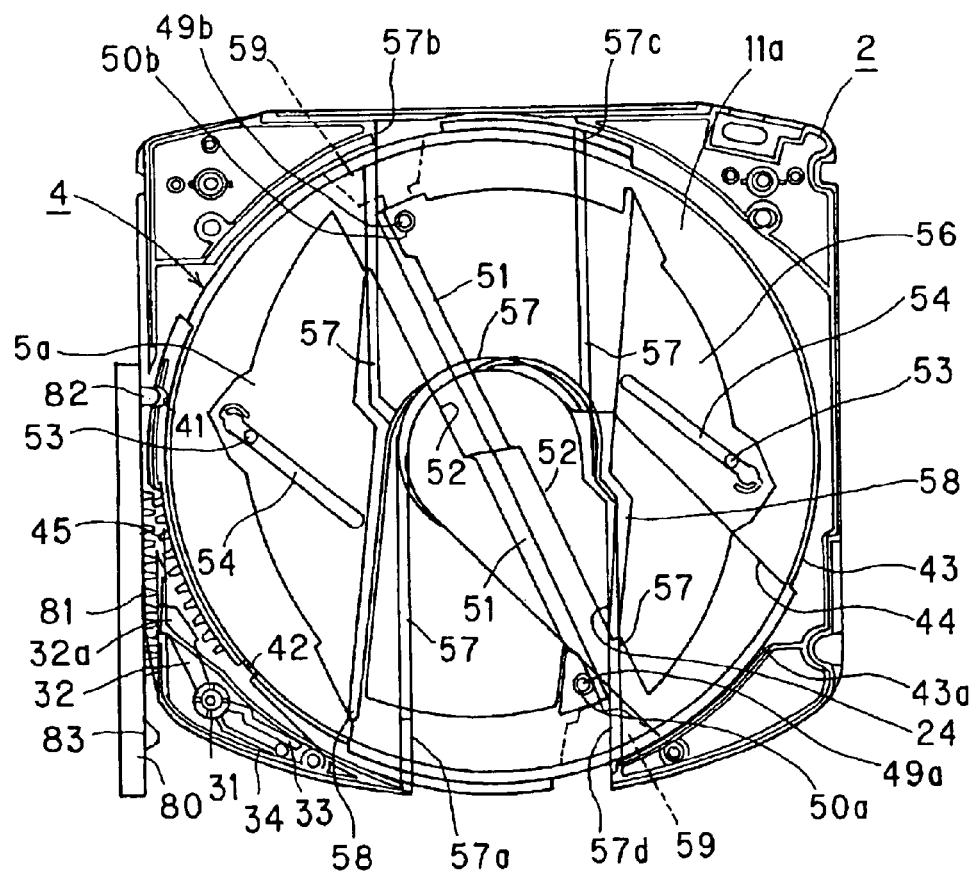
FIG. 22 is a plan view of the pair of shutter members with the rack of the shutter releasing member being engaged with the gear of the inner rotor.

When the shutter releasing member 80 further moves ahead of the cartridge 1, the rack 81 will continuously press the operating projection 32a of the locking member 29, thereby keeping the inner rotor 4 unlocked. As shown in FIG. 22, the first engagement projection 82 is engaged in the first engagement concavity 41 exposed to outside through the inner rotor access opening 35b of the inner rotor 4 to put the inner rotor 4 in a ready state for rotation. The shutter releasing member 80 further moves ahead of the cartridge 1 to pivot the inner rotor 4. At this time, the lift-up projections 14 and 48 are disengaged from each other as shown in FIG. 21 and thus the friction is reduced, and hence the inner rotor 4 can smoothly be rotated with a small force. The rack 81 of the shutter releasing member 80 is put in mesh with the geared portion 45 exposed to outside through the inner rotor access opening 35b as shown in FIG. 22.

Figure 23:
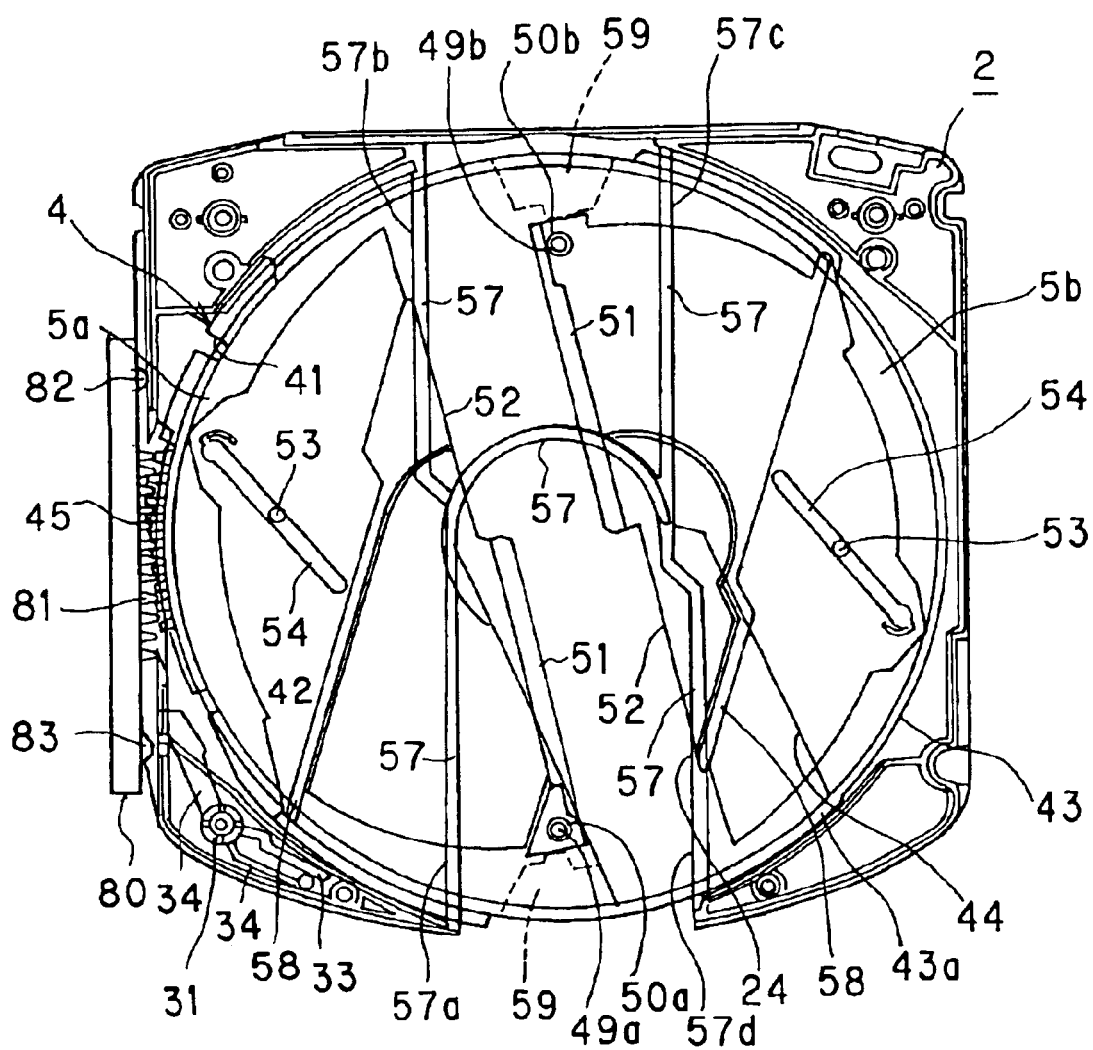
FIG. 23 is a plan view of the pair of shutter members in process of uncovering the opening.
Figure 24:
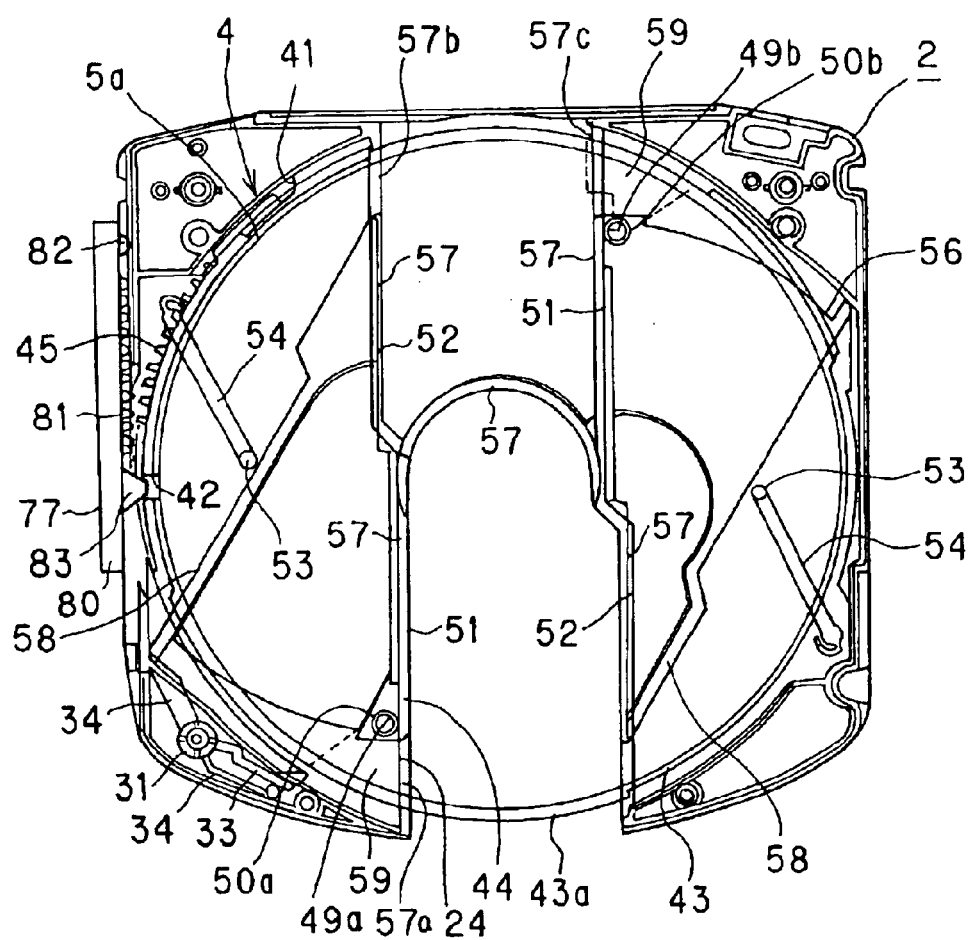
FIG. 24 is a plan view of the pair of shutter members having fully uncovered the opening.

Having further moved ahead of the cartridge 1, the shutter releasing member 80 having the rack 81 thereof put in mesh with the geared portion 45 of the inner rotor 4 rotates the inner rotor 4 as shown in FIG. 23. Thus, the guide pin 53 of the inner rotor 4 is engaged in the guide hole 54 so that the shutter members 5a and 5b pivoted to the pivots 49a and 49b, respectively, will pivot in a direction of uncovering the openings 24 and 44. When the rack 81 of the shutter releasing member 80 is disengaged from the geared portion 45 of the inner rotor 4, the shutter members 5a and 5b stop pivoting as shown in FIG. 24, and then the second engagement projection 83 of the shutter releasing member 80 is engaged in the second engagement concavity 42 of the inner rotor 4. Thus, the shutter members 5a and 5b are kept to fully uncover the openings 24 and 44.

Thereafter, the disc table 76 included in the disc rotation drive mechanism 74 enters through the opening 24b, is engaged into the central hole 3a of the optical disc 3 and cooperates with the clamping plate to clamp the optical disc 3 rotatably. Next, the optical pickup 75 enters through the opening 24a. Thus, the optical disc 3 is rotated by the disc rotation drive mechanism 74. A light beam is projected from the optical pickup 75 to the optical disc 3 at the signal recording surface thereof for writing information signal to the optical disc 3. A return light reflected from the signal recording surface is detected for reading information signal from the optical disc 3.

On the other hand, to remove the cartridge 1 from inside the recorder/player 70, the user operates the eject button included in a control unit, for example, provided on the recorder/player. Thus, the loading mechanism ejects the cartridge 1. The cartridge 1 will move to the disc slot 72, while the aforementioned shutter releasing member 80 will correspondingly retreat in relation to the cartridge 1. Along with the retreat of the shutter releasing member 80, the inner rotor 4 and pair of shutter members 5a and 5b will reversely take the steps they have taken for inserting the optical disc. That is, the inner rotor 4 will rotate reversely and the pair of shutter members 5a and 5b will cover the opening 24 in the cartridge body 2.

The cartridge 1 permits the user to freely replace the optical disc 3 through the disc insertion/removal opening 2a formed in the main side of the upper shell 6. Since the cartridge 1 receives the optical disc 3 through the insertion/removal opening 2a with the signal recording surface being directed down, it is possible to prevent any fingerprint or the like from adhering to the signal recording surface of the optical disc 3 being handled. The cartridge 1 permits to use the optical disc 3 normally used, not encased in any cartridge or the like, in a recorder/player 70 dedicated for a disc cartridge including the common parts such as the inner rotor 4, shutter members 5a and 5b, locking members 29, etc. the cartridge 1 and of which the optical disc pre-encased therein can not be replaced with another. Since the cartridge 1 can be produced following almost same manufacturing procedure for a disc cartridge, it can be manufactured in a disc cartridge production line.

Figure 25:
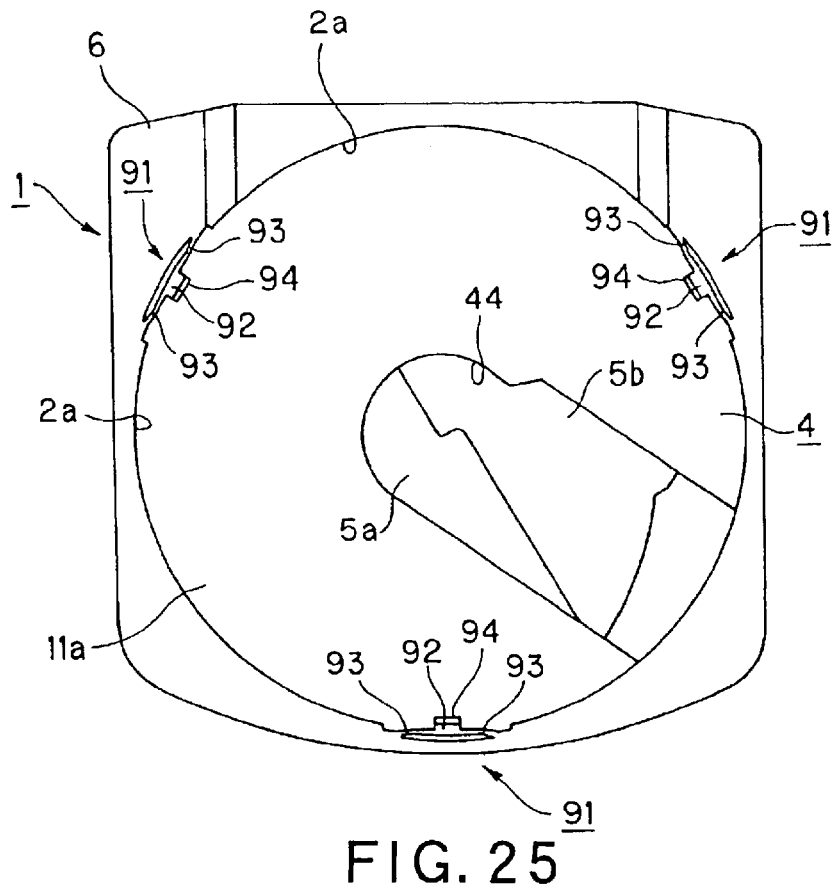
FIG. 25 is a plan view of the cartridge with the optical disc come-off preventive mechanisms provided around the optical disc insertion/removal opening.
Figure 26:
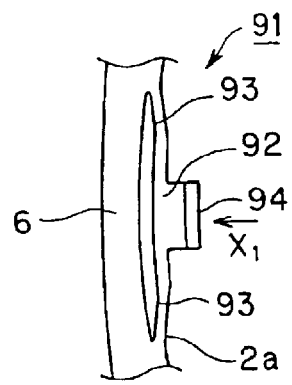
FIG. 26 is a segmentary plan view of the come-off preventive mechanism.

Note that as shown in FIG. 25, a come-off preventive mechanism 91 may be provided in a plurality of places around the insertion/removal opening 2a of the upper shell 6 included in the cartridge 1 to prevent the optical disc 3 held in the disc receptacle 11a from coming off. The come-off preventive mechanism 91 is provided in three places around the insertion/removal opening 2a. Each of the come-off preventive mechanisms 91 is formed integrally with the opening wall 11 as shown in FIG. 26 to avoid an increased number of cartridge parts. The come-off preventive mechanism 91 includes a come-off preventive piece 92 to prevent the optical disc 3 held in the disc receptacle 11a from coming off, and elastically flexible pieces 93 to couple the come-off preventive piece 92 and opening wall 11 with each other. The come-off preventive piece 92 is provided projecting toward the perimeter of the insertion/removal opening 2a to catch the perimeter of the optical disc 3 held in the disc receptacle 11a. The end top of the come-off preventive piece 92 is tapered, and the tapered end top serves as an insertion guide 94 to guide the optical disc 3 being inserted into the disc receptacle 11a. The two elastically flexible pieces 93 are provided across the come-off preventive piece 92 to couple the latter to the opening wall 11. When inserting the optical disc 3, the elastically flexible pieces 93 will be moved outwardly of the disc receptacle 11a and the come-off preventive piece 92 move toward the perimeter of the insertion/removal opening 2a, thus permitting to receive the optical disc 3 in the disc receptacle 11a.

Figure 27:
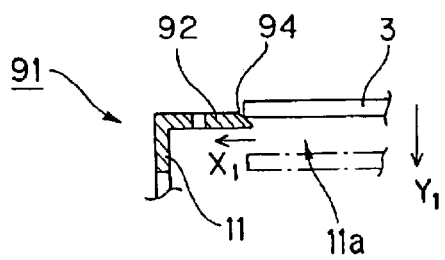
FIG. 27 is a segmentary sectional view of the come-off preventive mechanism.

As shown in FIG. 27, when the optical disc 3 is inserted into the disc receptacle 11a, the insertion guide 94 is pressed by the perimeter of the optical disc 3 in the direction of arrow $Y_1$ in FIG. 27. More specifically, when the insertion guide 94 is pressed in the direction of arrow $Y_1$ in FIG. 27, the elastically flexible pieces 93 are elastically moved in the direction of arrow $X_1$ in FIGS. 26 and 27, and thus the come-off preventive piece 92 is provisionally moved toward the perimeter of the insertion/removal opening 2a against the elasticity of the elastically flexible pieces 93. Thus, the optical disc 3 falls into the disc receptacle 11a.

Note that the optical disc 3 will possibly have the signal recording surface thereof stained and/or damaged if it is replaced repeatedly too many times. On this account, the optical disc 3 once received in the disc receptacle 11a should desirably be not easily removable from the cartridge 1. To this end, the come-off preventive mechanism 91 to prevent at least the optical disc 3 from coming off is constructed as follows. Namely, its end top is tapered as the insertion guide 94 and its surface for catching the optical disc 3 is made flat in parallel to the optical disc 3, so that once the optical disc 3 is received in the disc receptacle 11a, the come-off preventive piece 92 will not easily be movable toward the perimeter of the insertion/removal opening 2a against the elasticity of the elastically flexible pieces 93 and thus the optical disc 3 cannot easily be taken out of the disc receptacle 11a.

Note that in the foregoing, the present invention has been explained concerning the embodiment thereof provided with the three come-off preventive mechanisms 91 but the come-off preventive mechanism 91 may be provided in one place, or in a plurality of places to prevent the optical disc 3 more positively from coming off.

Figure 28:
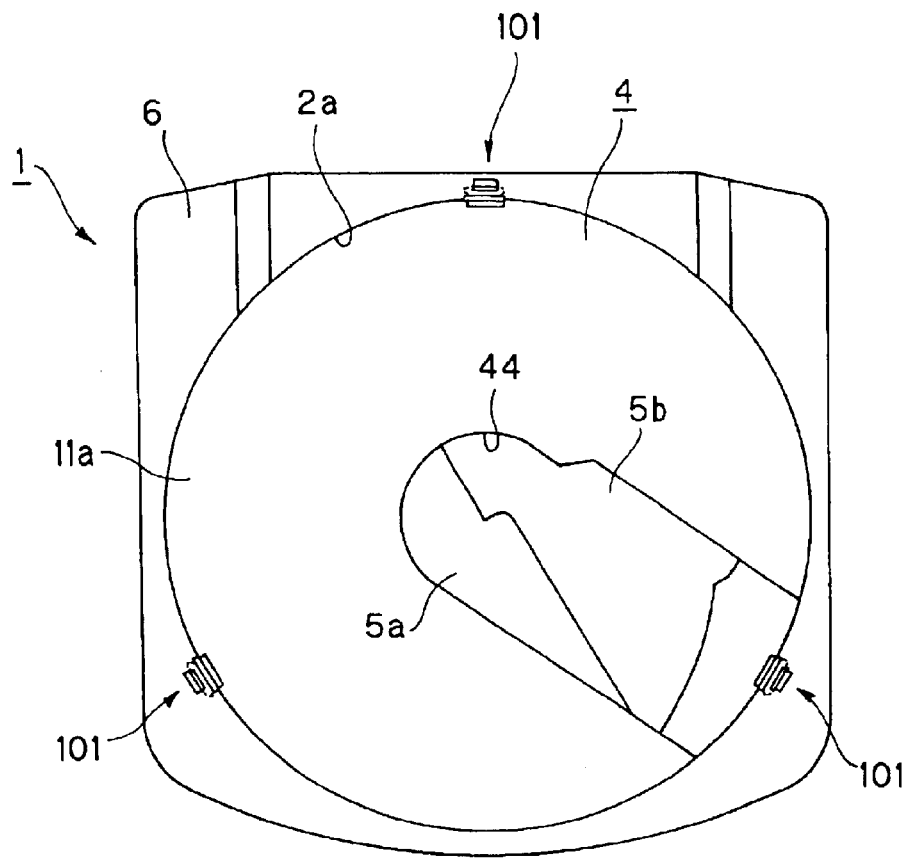
FIG. 28 is a plan view of the cartridge with the optical disc come-off preventive mechanisms provided around the optical disc insertion/removal opening.
Figure 29:
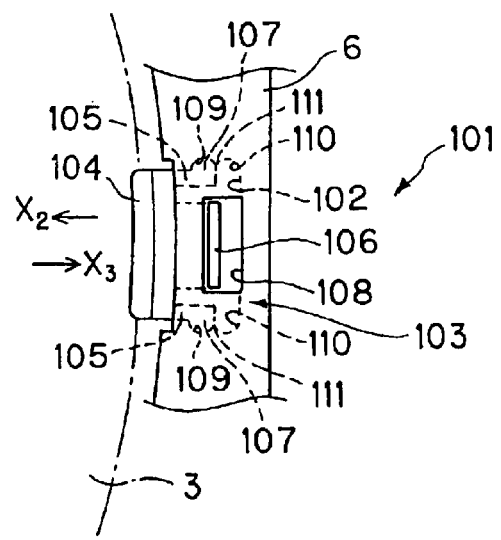
FIG. 29 is a segmentary plan view of the optical disc come-off preventive mechanism.
Figure 30:
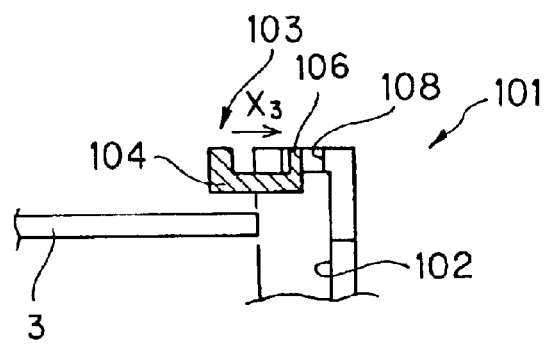
FIG. 30 is a segmentary sectional view of the optical disc come-off preventive mechanism.

The come-off preventive mechanism for the optical disc 3 received in the disc receptacle 11a may be adapted as shown in FIGS. 28 to 30. As shown, the come-off preventive mechanism generally indicated with a reference 101 is provided in three places around the insertion/removal opening 2a. Each of the come-off preventing mechanisms 101 includes a receiver 102 formed in the wall of the insertion/removal opening 2a and a come-off preventive member 103 received in the receiver 102. The come-off preventive member 103 is composed of a come-off preventive piece 104 to catch the perimeter of the optical disc 3 held in the disc receptacle 11a and thus prevent the optical disc 3 from coming from the disc receptacle 11a, elastically flexible pieces 105 to limit the movement of the come-off preventive member 103, and an operating piece 106 to operate the come-off preventive member 103. The elastically flexible pieces 105 are formed to elastically move inwardly in the direction of arrow $X_2$ in FIG. 29, and each of them has an engagement portion 107 provided on the free end thereof.

The receiver 102 to receive the come-off preventive member 103 is formed to such a size that the come-off preventive piece 104 projects toward the insertion/removal opening 2a and can be moved between a come-off preventive position in which it catches the perimeter of the optical disc 3 held in the disc receptacle 11a and a disc insertion/removal position where the come-off preventive piece 104 retreats from the insertion/removal opening 2a and the optical disc 3 can be inserted or removed. The come-off preventive member 103 received in the receiver 102 has the operating piece 106 thereof exposed to outside through an access hole 108 formed in the upper shell 6. The engagement portion 107 of each elastically flexible piece 105 is selectively engaged in either a first engagement concavity 109 or second engagement concavity 110 formed in the receiver 102. Between the first and second engagement concavities 109 and 110, there is provided a projection 111 which clicks when overridden by the engagement portion 107.

In the come-off preventive mechanism 101, when the optical disc 3 is inserted into, or removed from, the cartridge 1, the operating piece 106 exposed to outside through the access hole 108 is moved toward the wall of the insertion/removal opening 2a in the direction of arrow $X_3$ in FIGS. 29 and 30 for engagement of the engagement portion 107 into the second engagement concavity 110. Thus, the come-off preventive member 103 is held in the insertion/removal position where the come-off preventive piece 104 has retreated from the insertion/removal opening 2a and the optical disc 3 can be inserted or removed. Namely, the optical disc 3 can be inserted into, or removed from, the cartridge 1. Once the optical disc 3 is inserted into the disc receptacle 11a, when the operating piece 106 exposed to outside through the access hole 108 is moved toward the insertion/removal opening 2a, the engagement portion 107 moves from the second engagement concavity 110 to the first engagement concavity 109. When overriding the projection 111, the engagement portion 107 will click. When the engagement portion 107 is engaged in the first engagement concavity 109, the come-off preventive member 103 is held in the come-off preventive position where the come-off preventive piece 104 projects toward the insertion/removal opening 2a. In case the come-off preventive mechanism 101 is provided in a plurality of places so that even if one of the come-off preventive members 103 is moved erroneously to the disc insertion/removal position, the other come-off preventive members 103 will stay in their respective come-off preventive positions, it is possible to prevent the optical disc 3 from erroneously coming from the disc receptacle 11a.

Figure 31:
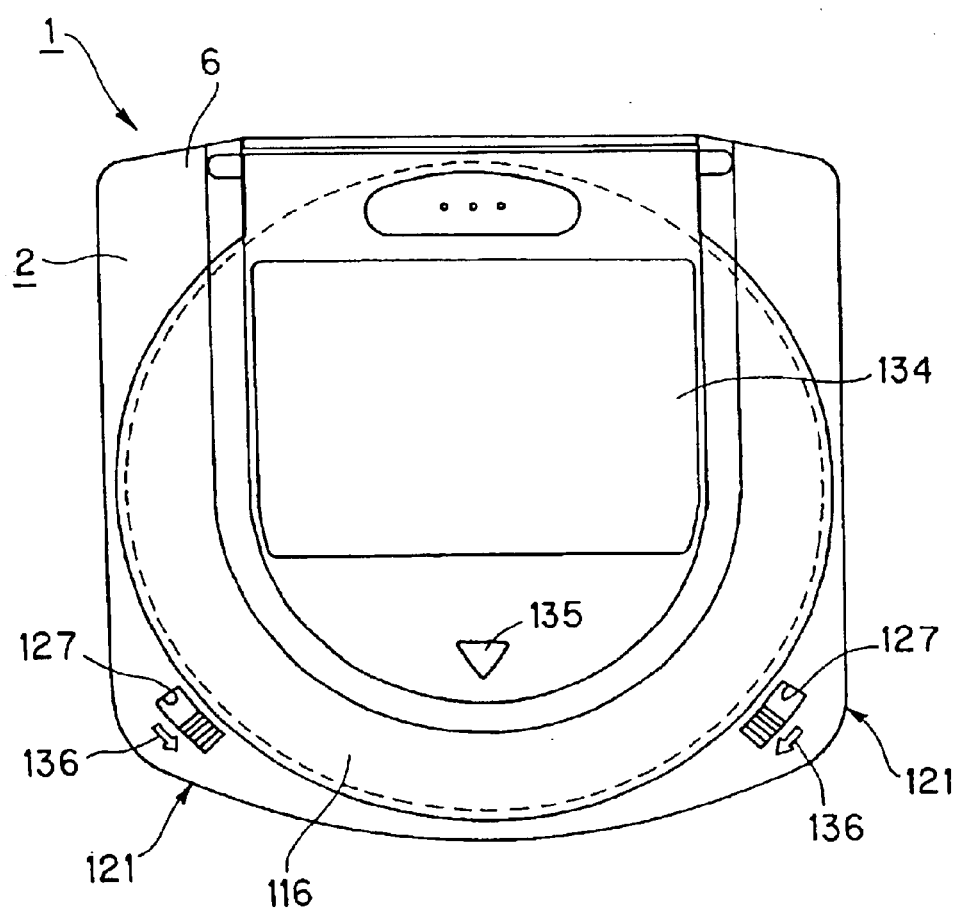
FIG. 31 is a plan view of the cartridge provided with a cover.
Figure 32:
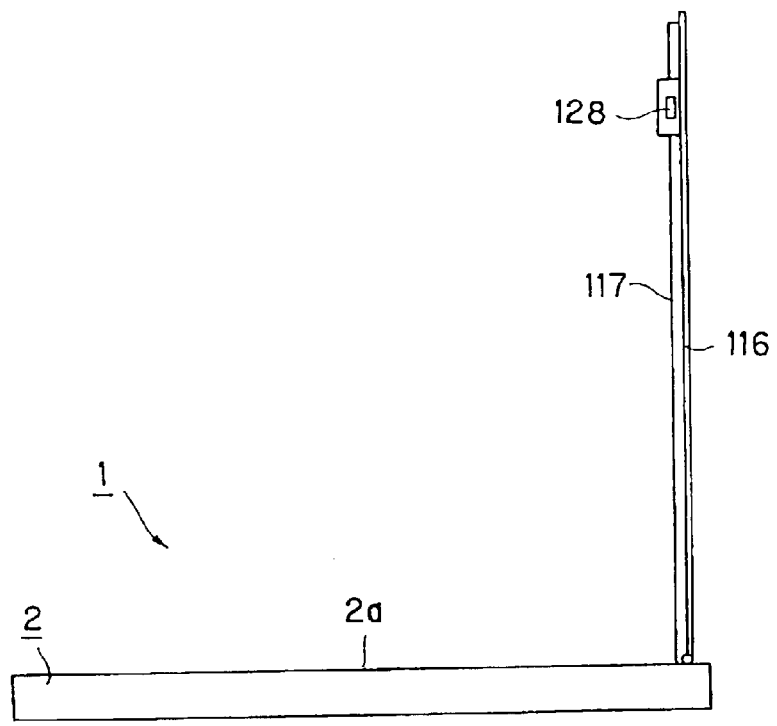
FIG. 32 is a side elevation of the cartridge with the optical disc insertion/removal opening being uncovered with the cover opened.

The cartridge 1 may have provided on the cartridge body 2 thereof a cover which covers the disc insertion/removal opening 2a to prevent the optical disc 3 received in the disc receptacle 1a from coming off. More specifically, the upper shell 6 of the cartridge body 2 has a cover 116 installed thereon as shown in FIGS. 31 and 32. The cover 116 is formed to have a generally same size as the insertion/removal opening 2a and has a rising wall 117 provided along the perimeter thereof. Such a cover 116 is pivoted to a pivot 118 provided at the rear side of the cartridge body 2, and thus it is supported pivotally on the cartridge body 2. When the cover 116 covers the insertion/removal opening 2a, the opening wall 11 and rising wall 117 overlap each other, whereby any foreign matter such as dust will not easily enter the disc receptacle 11a. The cover 116 may be adapted to be forced by an forcing means such as a spring in a direction of uncovering the insertion/removal opening 2a.

Note that the cover 116 may has a window 134 which permits to view the optical disc 3 in the disc receptacle 11a through it. Also, there may be provided on the cover 116 a marking 135 such as an arrow to indicate the direction of insertion of the cartridge 1 into the recorder/player 70.

As shown in FIGS. 31 to 34, the cartridge 1 according to the present invention has a locking mechanism 121 to hold the cover 116 in a position where it covers the insertion/removal opening 2a. The locking mechanism 121 is provided in two places around the insertion/removal opening 2a. Each of these locking mechanisms 121 includes a receiver 122 formed in the wall of the insertion/removal opening 2a and an operating member 123 received in the receiver 122 to open and close the cover 116.

The cover operating member 123 consists of a tab 124 operable by the user, a first elastically flexible piece 125 to lock the cover 116, and a second elastically flexible piece 126 to hold the operating member 123 in a predetermined position.

The tab 124 is exposed to outside through a generally rectangular access hole 127 formed in the top of the upper shell 6. Also, the first elastically flexible piece 125 has formed at the end thereof a locking portion 129 which is engaged in an engagement hole 128 formed in the rising wall 117 of the cover 116. Also, the second elastically flexible piece 126 has an engagement portion 130 formed at the end thereof. The engagement portion 130 is selectively engaged in a first engagement concavity 131 destined for holding the operating member 123 provided in the receiver 122 in a locking position where the locking portion 129 is engaged in the engagement hole 128, and a second engagement concavity 132 destined for holding the operating member 123 in an unlocking position where the locking portion 129 having unlocked the cover 116 is not engaged in the engagement hole 128. Between the first and second engagement concavities 131 and 132, there is provided a projection 133 which clicks when it is overridden by the engagement portion 130.

Figure 33:
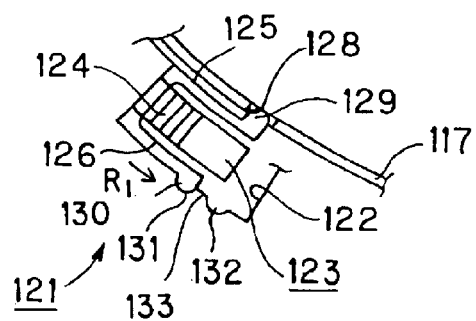
FIG. 33 is a segmentary plan view of the locking mechanism in a position where it locks the cover.
Figure 34:
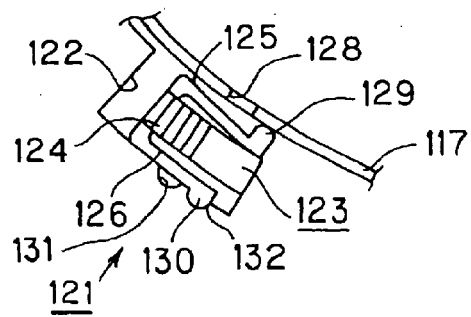
FIG. 34 is a segmentary plan view of the locking mechanism in a position where it unlocks the cover.

When the cover 116 is being locked to cover the insertion/removal opening 2a, the locking portion 129 of the first elastically flexible piece 125 is engaged in the engagement hole 128 in the rising wall 117 of the cover 116, while the engagement portion 130 of the second elastically flexible piece 126 is engaged in the first engagement concavity 131 to hold the operating member 123 in the locking position, as shown in FIG. 33. When the tab 124 exposed to outside through the access hole 127 is moved in the direction of arrow $S_1$ in FIG. 33 in order to unlock the cover 116, the engagement portion 130 overrides the projection 133 against the elasticity of the second elastically flexible piece 126 and gets engaged into the second engagement concavity 132, while the first elastically flexible piece 125 is moved toward the tab 124 and the locking portion 129 gets disengaged from the engagement hole 128, as shown in FIG. 34. At this time, the engagement portion 130 overrides the projection 133 to click. Thus, the user can know that the operating member 123 has been moved from one to another position. The locking mechanism 121 can be provided in a plurality of places. In this case, even when one of the operating members 123 is erroneously moved from the locking position to the unlocking position, the other operating members 123 will stay in their respective locking positions to prevent the cover 116 from wrongly uncovering the insertion/removal opening 2a, and thus the optical disc 3 will not come off the disc receptacle 11a. It should be noted that near the access hole 127, there may be provided a marking 136 indicating a direction in which the operating member 123 is to be moved, for example, an unlocking direction.

Figure 35:
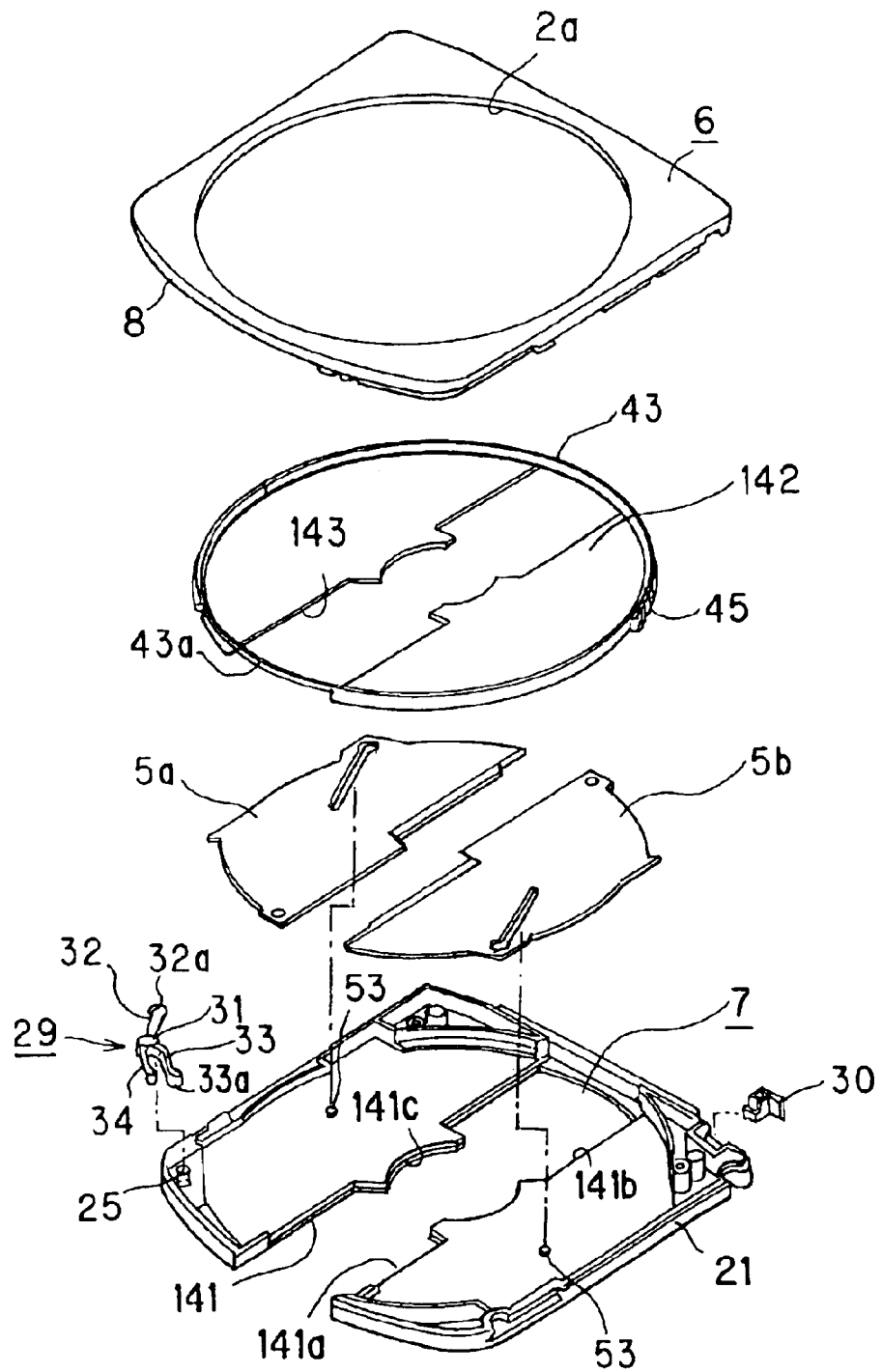
FIG. 35 is an exploded perspective view of a variant of the cartridge according to the present invention.
Figure 36:
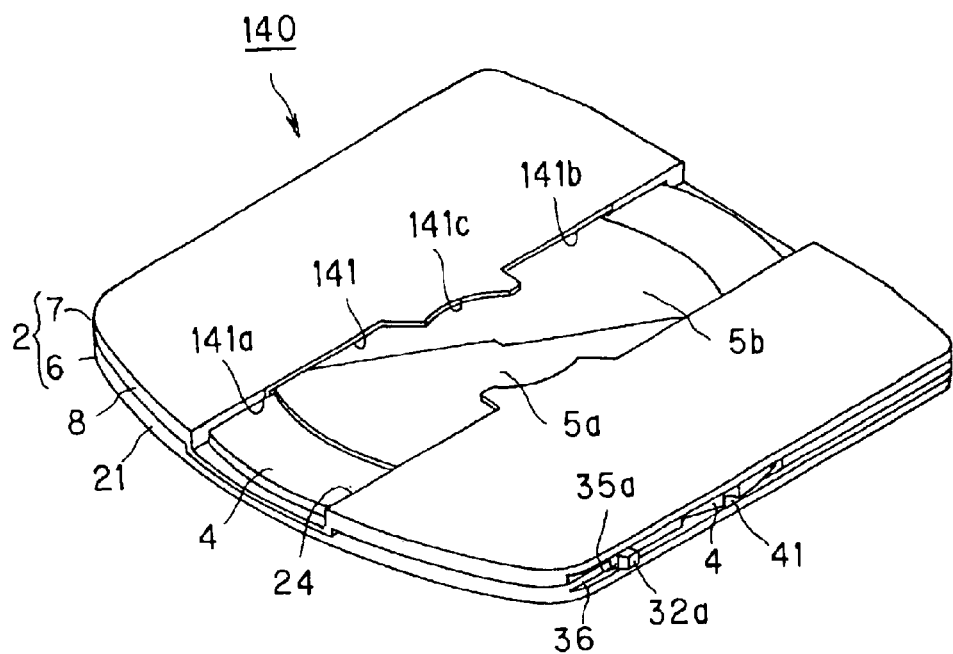
FIG. 36 is a perspective view, from below, of the cartridge in FIG. 35.
Figure 37:
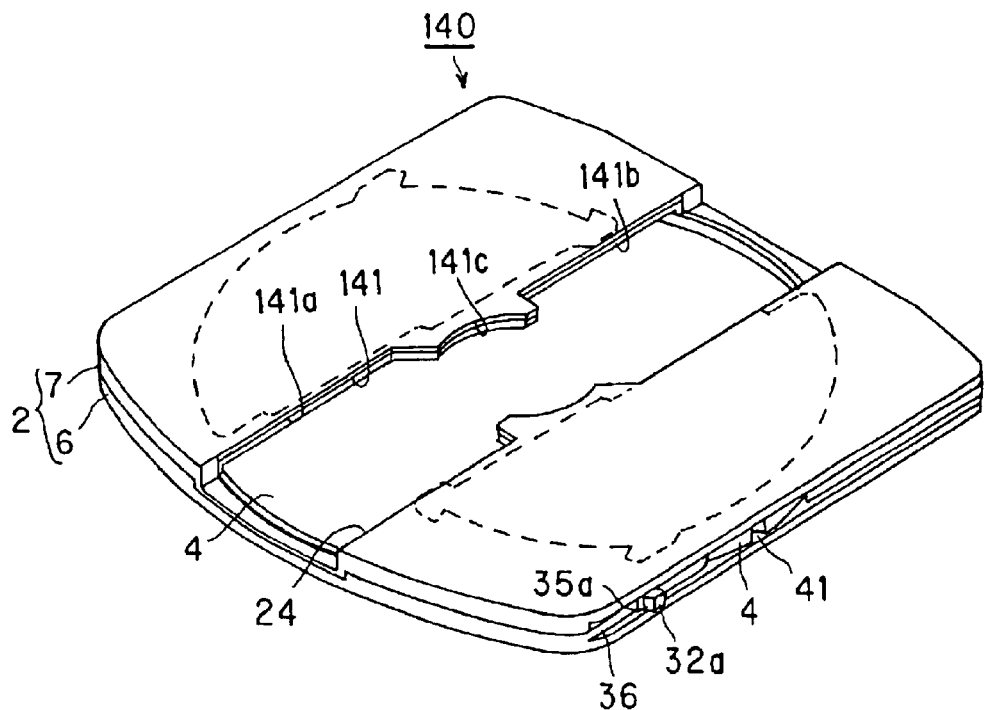
FIG. 37 is a perspective view of the cartridge in FIG. 36 with the pair of shutter members being released to uncover the opening.

In the above embodiment, the opening 24 is formed to extend from the front toward the center of the cartridge body 2. However, the present invention can be applied to a cartridge 140 shown in FIGS. 35 to 37. The cartridge 140 has formed therein an opening 141 extending generally in parallel to the direction of insertion into the recorder/player 70 from the front to the rear thereof. More specifically, the opening 141 is formed in the bottom of the cartridge 1 to have a generally rectangular shape extending from near the front center to near the rear center of the lower shell 7. The front and rear portions of the opening 141 are used as write/read openings 141a and 141b the optical pickup enters, and the central portion of the opening 141 is used as a drive opening 141c the disc rotation drive mechanism enters. The cartridge 140 has provided therein an inner rotor 142 having formed therein an opening 143 corresponding to the opening 141 and having a generally same radial size as the opening 141. It should be noted that the other construction of this cartridge 140 is common to that of the aforementioned cartridge 1 and so will not be explained in detail.

In the cartridge 140 loaded in the recorder/player, the shutter members 5a and 5b are opened by the shutter releasing mechanism of the recorder/player, thus the opening 141 is uncovered and the optical disc 3 is exposed to outside. Then the optical disc 3 is clamped and rotated by the disc rotation drive mechanism in the recorder/player, having entered the cartridge 1 through the opening 141c. Also, the optical pickup enters the opening 141a or 141b. Projecting a light beam to the optical disc 3, the optical pickup writes information signal to the optical disc 3. projects a light beam to the optical disc 3. Detecting a return light reflected from the signal recording surface of the optical disc 3, the optical pickup reads information signal from the optical disc 3. Since the cartridge 140 allows to use two optical pickups for write and read of information signal, it will make it possible to write and read information signal in a reduced length of time.

INDUSTRIAL APPLICABILITY

According to the present invention, the cartridge has an insertion/removal opening formed in the main side of the upper shell, through which a disc can be freely inserter into, or removed from, the cartridge. Therefore, the cartridge having a disc held in the cartridge body thereof can be loaded into the recorder and/or player to write information signal to the disc and also read information signal from the disc. Since in the cartridge according to the present invention, the structure including the shutter members etc. is common to a recording-medium cartridge (having a recording medium pre-encased therein), the cartridge can be loaded into a recorder and/or player dedicated for use with such a recording-medium cartridge. Further, since the cartridge according to the present invention has the generally same construction as that of the recording medium cartridge of which the recording medium pre-encased therein is not replaceable, it can easily be manufactured using the same assembling line for the recording-medium cartridge.

What is claimed is:

1. A cartridge comprising:
    a cartridge body consisting of an upper shell having a disc insertion/removal opening formed in the main side thereof and a lower shell, butted to each other to define a disc receptacle in which a disc is rotatably held, the lower shell having formed therein a first opening through which a disc held in the disc receptacle is at least partially exposed to output;
    a middle shell disposed rotatably in the cartridge body to define the bottom of the disc receptacle by the main side thereof, having the main side thereof exposed to outside through the insertion/removal opening in the upper shell, having formed in the main side thereof a second opening corresponding to the first opening in the lower shell of the cartridge body and which is rotatably received in the cartridge body; and
    a pair of shutter members which uncovers the first and second openings when the middle shell rotates until the first and second openings are aligned with each other.

2. The cartridge as set forth in claim 1, wherein there is provided around the disc insertion/removal opening in the upper shell a disc come-off preventive mechanisms to prevent a disc received in the disc receptacle through the insertion/removal opening from coming off;
    the come-off preventive mechanism being composed of a disc insertion guide to guide a disc being inserted into the disc receptacle and a come-off preventive piece to prevent the disc once received in the fisc receptacle from coming off, the come-off preventive piece being formed integrally on contact with elastically flexible pieces which are elastically moved radially of the disc receptacle.

3. The cartridge as set forth in claim 2, wherein the come-off preventive mechanism is provided in a plurality of places around the insertion/removal opening in the upper shell.

4. The cartridge as set forth in claim 1, wherein there is provided around the insertion/removal opening in the upper shell a disc come-off preventive mechanisms;

the come-off preventive mechanisms including a come-off preventive member received in a receiver formed in the wall of the insertion/removal opening in the upper shell to prevent a disc received in the disc receptacle from coming off;

the come-off preventive member including elastically flexible pieces each having an engagement portion formed at one end thereof, and an operating piece to move the come-off preventive piece between a come-off preventive position where the come-off preventive mechanism is to prevent the disc received in the disc receptacle and an access position in which the disc is to be inserted and/or removed; and the receiver including a first engagement concavity in which the engagement portion is engaged when the come-off preventive mechanism holds the come-off preventive member in the come-off preventive position, and a second engagement concavity in which the engagement portion is engaged when the come-off preventive mechanism holds the come-off preventive member in the access position.

5. The cartridge as set forth in claim 4, wherein the come-off preventive mechanism is provided in a plurality of places around the insertion/removal opening in the upper shell.

6. The cartridge as set forth in claim 1, wherein the cartridge body is provided with a cover to uncover and cover the insertion/removal opening.

7. The cartridge as set forth in claim 6, further comprises a locking mechanism to lock the cover in a closed position where the covers closes the insertion/removal opening;

the locking mechanism including a cover operating member disposed in the receiver formed in the wall of the insertion/removal opening in the upper shell;

the cover operating member including a first elastically flexible piece having provided at an end thereof a locking portion which is engaged on the engagement piece on the cover, a second elastically flexible piece having an engagement portion provided at an end thereof, and an operating portion which moves the cover operating member between a locking position in which the locking portion is engaged on the engagement piece and an unlocking position in which the locking portion is not disengaged on the engagement piece; and the receiver including a first engagement concavity in which the engagement portion is to be engaged when the cover operating member is held in the locking position, and a second engagement concavity in which the engagement portion is to be engaged when the cover operating member is held in the unlocking position.

8. The cartridge as set forth in claim 7, wherein the locking mechanism is provided in a plurality of places around the insertion/removal opening.

* * * * *